United States Patent
Anderson et al.

(10) Patent No.: US 9,328,275 B2
(45) Date of Patent: May 3, 2016

(54) PHOSPHINE-CATALYZED, MICHAEL ADDITION-CURABLE SULFUR-CONTAINING POLYMER COMPOSITIONS

(71) Applicant: PRC-DeSoto International, Inc., Sylmar, CA (US)

(72) Inventors: Lawrence G. Anderson, Allison Park, PA (US); Juexiao Cai, Stevenson Ranch, CA (US); Mark P. Bowman, New Kensington, PA (US); Renhe Lin, Stevenson Ranch, CA (US)

(73) Assignee: PRC DeSoto International, Inc., Sylmar, CA (US)

( * ) Notice: Subject to any disclaimer, the term of this patent is extended or adjusted under 35 U.S.C. 154(b) by 20 days.

(21) Appl. No.: 14/200,630

(22) Filed: Mar. 7, 2014

(65) Prior Publication Data
US 2015/0252233 A1  Sep. 10, 2015

(51) Int. Cl.
| | |
|---|---|
| *C09J 181/02* | (2006.01) |
| *B05D 5/00* | (2006.01) |
| *C09D 4/00* | (2006.01) |
| *C08G 75/00* | (2006.01) |
| *C08G 75/02* | (2016.01) |
| *C09J 181/00* | (2006.01) |
| *C08L 63/04* | (2006.01) |
| *C08L 81/00* | (2006.01) |
| *C08L 81/02* | (2006.01) |

(52) U.S. Cl.
CPC ............... *C09J 181/02* (2013.01); *B05D 5/00* (2013.01); *C08G 75/00* (2013.01); *C08G 75/02* (2013.01); *C08L 63/04* (2013.01); *C08L 81/00* (2013.01); *C08L 81/02* (2013.01); *C09D 4/00* (2013.01); *C09J 181/00* (2013.01)

(58) Field of Classification Search
CPC ...... C09J 181/00; C09J 181/02; C09J 181/04; C09J 181/06; C09J 181/08
USPC ........................................................ 525/535
See application file for complete search history.

(56) References Cited

U.S. PATENT DOCUMENTS

| | | | |
|---|---|---|---|
| 3,138,573 A | | 6/1964 | Le Fave et al. |
| 3,234,189 A | * | 2/1966 | Tashlick et al. ............... 525/535 |
| 3,258,495 A | * | 6/1966 | Le Fave et al. ................. 568/62 |
| 4,031,271 A | * | 6/1977 | Bush .......................... 430/277.1 |
| 4,366,307 A | | 12/1982 | Singh et al. |

(Continued)

FOREIGN PATENT DOCUMENTS

| | | |
|---|---|---|
| WO | WO 2010/030771 A1 | 3/2010 |
| WO | WO 2013/192480 A2 | 12/2013 |

OTHER PUBLICATIONS

Chan et al., "Nucleophile-Initiated Thiol-Michael Reactions: Effect of Organocatalyst, Thiol and Ene," Macromolecules 2010, 43, 6381-6388 (8 pages).

(Continued)

*Primary Examiner* — Mike M Dollinger
(74) *Attorney, Agent, or Firm* — William R. Lambert

(57) ABSTRACT

Compositions comprising Michael acceptor-terminated sulfur-containing prepolymers, thiol-terminated sulfur-containing prepolymers, and e phosphine catalysts useful in aerospace sealant applications are disclosed. The compositions exhibit extended pot life, cure rapidly following activation, and provide cured sealants having improved properties useful in aerospace sealant applications.

25 Claims, 1 Drawing Sheet

(56) References Cited

U.S. PATENT DOCUMENTS

| | | | |
|---|---|---|---|
| 4,609,762 A | 9/1986 | Morris et al. | |
| 4,623,711 A | 11/1986 | Morris et al. | |
| 5,225,472 A | 7/1993 | Cameron et al. | |
| 5,270,364 A | 12/1993 | Schwartz et al. | |
| 5,284,888 A | 2/1994 | Morgan | |
| 5,834,611 A * | 11/1998 | Driessen-Holscher et al. | 556/21 |
| 6,123,179 A | 9/2000 | Chen | |
| 6,172,179 B1 | 1/2001 | Zook et al. | |
| 6,184,280 B1 | 2/2001 | Shibuta | |
| 6,525,168 B2 | 2/2003 | Zook et al. | |
| 7,585,932 B2 * | 9/2009 | Byers et al. | 528/376 |
| 8,513,339 B1 * | 8/2013 | Keledjian et al. | 524/80 |
| 2005/0176093 A1 * | 8/2005 | Ahn et al. | 435/68.1 |
| 2006/0094804 A1 | 5/2006 | Lachowicz et al. | |
| 2010/0010133 A1 | 1/2010 | Zook et al. | |
| 2010/0041839 A1 | 2/2010 | Anderson et al. | |
| 2010/0068393 A1 | 3/2010 | Bowman | |
| 2011/0319559 A1 | 12/2011 | Kania et al. | |
| 2012/0088895 A1 | 4/2012 | Zalich et al. | |
| 2012/0234205 A1 | 9/2012 | Hobbs et al. | |
| 2012/0238707 A1 | 9/2012 | Hobbs et al. | |
| 2013/0345371 A1 | 12/2013 | Anderson et al. | |
| 2013/0345389 A1 | 12/2013 | Cai et al. | |
| 2014/0275474 A1 | 9/2014 | Rao et al. | |
| 2014/0378649 A1 | 12/2014 | Cai et al. | |
| 2014/0378650 A1 | 12/2014 | Rao et al. | |
| 2015/0119549 A1 | 4/2015 | Rao et al. | |

OTHER PUBLICATIONS

Martell et al., "Coordination of Al (III) in the environment and in biological systems," Coordination Chemistry Reviews, 1996, 149, 311-328 (18 pages).

Mather et al., "Michael addition reactions in macromolecular design for emerging technologies," Progress in Polymer Science, 2006, vol. 31, p. 487-531 (45 pages).

Yokel, "Aluminum chelation principles and recent advances," Coordination Chemistry Reviews, 2002, vol. 228, p. 97-113 (17 pages).

* cited by examiner

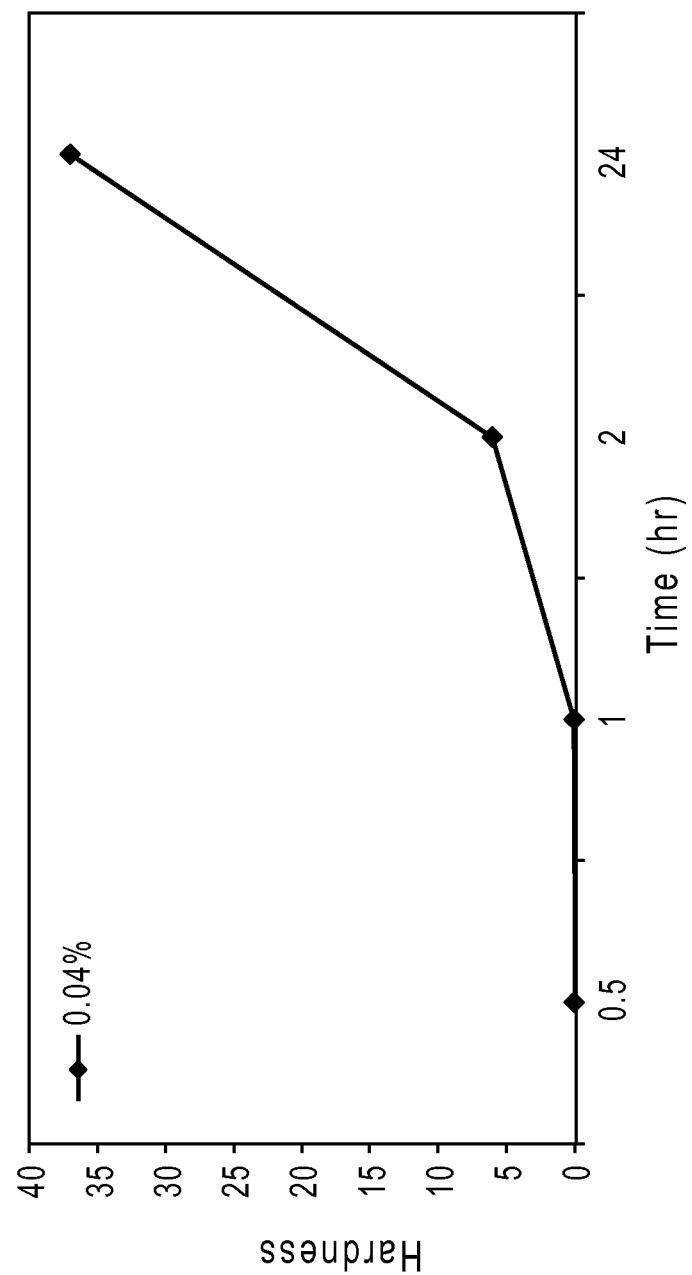

PHOSPHINE-CATALYZED, MICHAEL ADDITION-CURABLE SULFUR-CONTAINING POLYMER COMPOSITIONS

FIELD

The present disclosure relates to phosphine-catalyzed compositions containing Michael acceptor-terminated sulfur-containing prepolymers and thiol-terminated prepolymers. The phosphine-catalyzed compositions cure at room temperature to provide cured sealants that exhibit properties acceptable for use in aerospace sealant applications.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings. In sealants such as those described in U.S. Pat. No. 6,172,179, an amine catalyst is used to provide a cured product. Such systems typically cure in 2 hours to 12 hours and although exhibiting acceptable fuel resistance and thermal resistance for many applications, improved performance of the cured product is desirable.

Michael addition curing chemistries are often used in acrylic-based polymer systems and, as disclosed in U.S. Pat. No. 3,138,573, have been adapted for use in polysulfide compositions. Application of Michael addition curing chemistries to sulfur-containing polymers not only results in cured sealants having faster cure rates and enhanced performance including fuel resistance and thermal resistance, but also provides a sealant with improved physical properties such as elongation. The use of Michael addition curing chemistries for sulfur-containing prepolymer compositions useful in aerospace sealant application is disclosed in U.S. Application Publication No. 2013/0345371, which is incorporated by reference in its entirety.

The compositions disclosed in U.S. Application Publication No. 2013/0345371 employ one or more base catalysts such as amine catalysts. In the presence of an appropriate base such as 1,8-diazabicycloundec-7-ene (DBU), the thiol-Michael addition reaction is fast and the cure time is typically less than 2 hours. Without an appropriate base catalyst, the Michael addition reaction between, for example, a thiol-terminated polythioether and a Michael acceptor reacts slowly, providing a pot life, for example, depending on the temperature, of several days to weeks. The reaction mechanisms for thiol-Michael addition reactions are disclosed by Chan et al., *Macromolecules* 2010, 43, 6381-6388.

In practice, the foregoing compositions can be provided as two-part compositions in which a thiol-terminated sulfur-containing prepolymer and a Michael acceptor are provided as separate components, with the amine catalyst in one or both components, and the two parts are mixed shortly prior to use. For example, if the catalytic amine is a tertiary amine, the amine catalyst may be in one or both components, and if the catalytic amine is a primary or secondary amine, the amine catalyst can only be included in the component containing the thiol-terminated sulfur-containing prepolymer. Alternatively, the base catalyst may be provided as a third component, and the component containing the thiol-terminated sulfur-containing prepolymer, the component containing the Michael acceptor, and the component containing the base catalyst can be mixed shortly before use. However, once the components are mixed, the Michael addition reaction proceeds, and depending at least in part on the temperature and on the type of amine catalyst, the working time is limited to less than 2 hours. Furthermore, once the composition starts to cure, there is little ability to control the reaction rate to take advantage of the complex chemistries taking place after the sealant is applied to a surface.

Michael addition curing chemistries catalyzed by appropriate bases such as primary or secondary amines are used in aerospace sealants. For example, Michael acceptor-terminated prepolymers suitable for use in aerospace sealant applications are disclosed in entitled U.S. application Ser. No. 14/200,569, filed on Mar. 7, 2014, U.S. Application Publication No. 2014/0378649, and U.S. Application Publication No. 2015/0119549, each of which is incorporated by reference in its entirety. Sulfur-containing prepolymers terminated with Michael acceptors such as vinyl sulfones or maleimides react rapidly with polythiols at room temperature in the presence of primary or secondary amine catalysts.

Tertiary phosphines are known to catalyze Michael addition reactions. Michael addition curing of coating compositions using phosphine catalysts is disclosed, for example, in U.S. Application Publication No. 2010/0068393. Phosphine catalysts provide rapid curing within a few seconds even at room temperature and therefore can be useful in spray coat applications.

SUMMARY

Phosphine-catalyzed compositions containing Michael acceptor-terminated sulfur-containing polymers that provide cured sealants exhibiting properties acceptable for use in aerospace sealant applications are disclosed.

In a first aspect, compositions are disclosed comprising a Michael acceptor-terminated sulfur-containing prepolymer; a thiol-terminated sulfur-containing prepolymer; and a phosphine catalyst.

In a second aspect, methods of using the composition comprising a Michael acceptor-terminated sulfur-containing prepolymer; a thiol-terminated sulfur-containing prepolymer; and a phosphine catalyst are disclosed, comprising applying the composition to a substrate; and allowing the composition to cure to provide a cured sealant.

BRIEF DESCRIPTION OF THE DRAWINGS

FIG. 1 is a graph showing hardness (Shore A) of a composition comprising a di(vinylsulfonyl)alkanol-terminated polythioether, a combination of thiol-terminated polythioethers, and 0.04 wt % trioctylphosphine during curing at room temperature.

Reference is now made to certain embodiments of compositions and methods. The disclosed embodiments are not intended to be limiting of the claims. To the contrary, the claims are intended to cover all alternatives, modifications, and equivalents.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of covalent bonding for a substituent or between two atoms. For example, the chemical group —CONH$_2$ is covalently bonded to another chemical moiety through the carbon atom. In certain instances, the expression "-*" is used to denote the point of bonding.

"Alkanearene" refers to a hydrocarbon group having one or more aryl and/or arenediyl groups and one or more alkyl and/or alkanediyl groups, where aryl, arenediyl, alkyl, and alkanediyl are defined herein. In certain embodiments, each aryl and/or arenediyl group(s) is $C_{6-12}$, $C_{6-10}$, and in certain embodiments, phenyl or benzenediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanearene group is $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, and in certain embodiments, $C_{6-9}$ alkanearene. Examples of alkanearene groups include diphenyl methane.

"Alkanearenediyl" refers to a diradical of an alkanearene group. In certain embodiments, the alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, and in certain embodiments, $C_{6-9}$ alkanearenediyl. Examples of alkanearenediyl groups include diphenyl methane-4,4'-diyl.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methanediyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" refers to a group having the structure —CR═CR$_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —CH═CH$_2$.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{1-6}$ alkyl, $C_{1-4}$ alkyl, and in certain embodiments, $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{1-6}$ alkyl, $C_{1-4}$ alkyl, and in certain embodiments, $C_{1-3}$ alkyl. It will be appreciated that a branched alkyl has at least three carbon atoms.

"Aryl" refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes 5- and 6-membered carbocyclic aromatic rings fused to a 5- to 7-membered heterocycloalkyl ring containing one or more heteroatoms chosen from N, O, and S. For such fused, bicyclic ring systems wherein only one of the rings is a carbocyclic aromatic ring, the point of attachment may be at the carbocyclic aromatic ring or the heterocycloalkyl ring. Examples of aryl groups include groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, an aryl group can have from 6 to 20 carbon atoms, and in certain embodiments, from 6 to 12 carbon atoms. Aryl, however, does not encompass or overlap in any way with heteroaryl, separately defined herein. Hence, a multiple ring system in which one or more carbocyclic aromatic rings is fused to a heterocycloalkyl aromatic ring, is heteroaryl, not aryl, as defined herein. In certain embodiments, an aryl group is phenyl.

"Arylalkyl" refers to an acyclic alkyl radical in which one of the hydrogen atoms bonded to a carbon atom is replaced with an aryl group. Examples of arylalkyl groups include benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylalkenyl, or arylalkynyl is used. In certain embodiments, an arylalkyl group is $C_{7-16}$ arylalkyl, e.g., the alkanyl, alkenyl or alkynyl moiety of the arylalkyl group is $C_{1-6}$ and the aryl moiety is $C_{6-10}$. In certain embodiments an arylalkyl group is $C_{7-9}$ arylalkyl, wherein the alkyl moiety is $C_{1-3}$ alkyl and the aryl moiety is phenyl. In certain embodiments, an arylalkyl group is $C_{7-16}$ arylalkyl, $C_{7-14}$ arylalkyl, $C_{7-12}$ arylalkyl, $C_{7-10}$ arylalkyl, $C_{7-8}$ arylalkyl, and in certain embodiments, benzyl.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heteroalkanediyl" refers to an alkanediyl group in which one or more of the carbon atoms are replaced with a heteroatom, such as N, O, S, or P. In certain embodiments of heteroalkanediyl, a heteroatom is selected from N and O.

"Heteroalkanearenediyl" refers to an alkanearenediyl group in which one or more of the carbon atoms are replaced with a heteroatom, such as N, O, S, or P. In certain embodiments of heteroalkanearenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Derived from" refers to a functional group or moiety that is created following reaction with another reactive functional group or moiety. For example, the moiety —CH$_2$—CH$_2$—S— can be derived from the reaction of an alkenyl group, —CH═CH$_2$ with a thiol group —SH. Similarly, the moiety —S— can be derived from the reaction of —SH with a group that is reactive with thiol groups. In certain embodiments, a group —R'— is derived from the reaction of the group —R with a group reactive with R. In certain embodiments, a moiety —R' is derived from the reaction of a compound R with a reactive group.

Core of a sulfur-containing prepolymer or adduct refers to the moiety forming the sulfur-containing prepolymer or adduct without the terminal functional groups or moieties comprising a terminal functional group. For example, the core of sulfur-containing prepolymer or adduct having the structure R$^f$—R—R$^f$ where each R$^f$ represents a moiety comprising a terminal functional group or a terminal functional group, is —R—.

Core of a diisocyanate refers to the moiety forming the diisocyanate without the isocyanate groups. For example, the core of a diisocyanate having the structure O═C═N—R—N═C═O is represented by —R—.

A "Michael acceptor" refers to an activated alkene, such as an alkenyl group proximate to an electron-withdrawing group such as, for example, a ketone, halo, carbonyl (—CO), nitro (—NO$_2$), nitrile (—CN), alkoxycarbonyl (—COOR), phosphonate (—PO(OR)$_2$), trifluoromethyl (—CF$_3$), sulfonyl (—SO$_2$—), trifluormethanesulfonyl (—SO$_2$CF$_3$), or p-toluenesulfonyl (—SO$_2$—C$_6$H$_4$—CH$_3$). In certain embodiments, a Michael acceptor group is selected from a vinyl ketone, a vinyl sulfone, a quinone, an enamine, a ketimine, an aldimine, an oxazolidine, and an acrylate. In certain embodiments, a Michael acceptor or Michael acceptor group does not encompass acrylates. Other examples of Michael acceptors are disclosed in Mather et al., *Prog. Polym. Sci.* 2006, 31, 487-531, and include acrylate esters, acrylonitrile, acrylamides, maleimides, alkyl methacrylates, cyanoacrylates. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor group is derived from a vinyl sulfone and has the structure of Formula (1):

$$—S(O)_2—CR═CH_2 \qquad (1)$$

where R is independently selected from hydrogen, fluorine, and $C_{1-3}$ alkyl. In certain embodiments, R is hydrogen. In certain embodiments, a Michael acceptor or Michael acceptor group does not encompass acrylates. A "Michael acceptor compound" refers to a compound comprising at least one Michael acceptor. In certain embodiments, a Michael acceptor compound is divinyl sulfone, and a Michael acceptor group is vinylsulfonyl (—S(O)$_2$—CH═CH$_2$).

A "Michael acceptor compound" refers to a compound comprising at least one Michael acceptor group. In certain embodiments, a Michael acceptor compound is divinyl sulfone, and a Michael acceptor group is vinylsulfonyl, e.g., —S(O)$_2$—CH═CH$_2$. Other examples of Michael acceptors are disclosed in Mather et al., *Prog. Polym. Sci.,* 2006, 31, 487-531, and include acrylate esters, acrylonitrile, acrylamides, maleimides, alkyl methacrylates, cyanoacrylates. Types of compounds that function as Michael acceptors include vinyl ketones, quinones, nitroalkenes, acrylonitriles, acrylates, methacrylates, cyanoacrylates, acrylamides, maleimides, dialkyl vinylphosphonate, and vinylsulfones. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor compound is divinyl sulfone, and a Michael acceptor group is vinylsulfonyl, i.e., —S(O)$_2$—CH═CH$_2$. In certain embodiments, a Michael acceptor compound is a bis(vinylsulfonyl) alkanol, and a Michael acceptor group is 1-(ethylenesulfonyl)-n-(vinylsulfonyl)alkanol, i.e., —CH$_2$—CH$_2$—S(O)$_2$—R$^{10}$—CH(—OH)—R$^{10}$—S(O)$_2$—CH=CH$_2$, and in certain embodiments, 1-(ethylenesulfonyl)-3-(vinylsulfonyl)propan-2-ol (—CH$_2$—CH$_2$—S(O)$_2$—CH$_2$—CH(—OH)—CH$_2$—S(O)$_2$—CH=CH$_2$).

Michael acceptor compounds having more than one Michael acceptor group are also well known. Examples include diacrylates such as ethylene glycol diacrylate and diethylene glycol diacrylate, dimethacrylates such as ethylene glycol methacrylate and diethylene glycol methacrylate, bismaleimides such as N,N'-(1,3-phenylene)dimaleimide and 1,1'-(methylenedi-4,1-phenylene)bismaleimide, vinylsulfones such as divinyl sulfone and 1,3-bis(vinylsulfonyl)-2-propanol, etc. In certain embodiments, a Michael acceptor group is a divinyl sulfonyl having the structure of Formula (2a) or Formula (2b):

—CH$_2$—CH$_2$—S(O)$_2$—R$^{10}$—CH(—OH)—R$^{10}$—S(O)$_2$—CH=CH$_2$ (2a)

—CH$_2$—CH$_2$—S(O)$_2$—CH$_2$—CH(—OH)—CH$_2$—S(O)$_2$—CH=CH$_2$ (2b)

where each R$^{10}$ is independently selected from C$_{1-3}$ alkanediyl.

A "metal ligand" refers to an ion or molecule that binds to a metal atom and potentially other atoms to form a coordination complex. The bonding between the metal and or atoms generally involves donation of one or more electronic pairs to the metal and the nature of the bonding can be covalent or ionic. Metal ligands provided by the present disclosure are capable of forming coordination complexes to aerospace surfaces such as aluminum and titanium surfaces, which may be oxidized. In the case of oxidized surfaces a metal ligand may form a coordination complex with a metal such as Al(III) and oxygen atoms. The coordination complex can enhance the adhesion of a coating or sealant to the metal or oxidized metal surface.

Metal ligands may be incorporated into the backbone of a prepolymer. Such reactive metal ligands may be commercially available or may be derivatized to include appropriate reactive substituent groups using methods known to those skilled in the art. Examples of sulfur-containing polymers incorporating metal ligands are disclosed in U.S. Application Publication No. 2014/0378650 and U.S. Application Publication No. 2014/0275474, each of which is incorporated by reference in its entirety.

Hydroxypyridinones comprise groups such as 3-hydroxy-4-pyridinone and 3-hydroxy-2-pyridinone having the structure of Formula (3a) or Formula (3b), respectively:

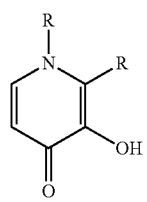
(3a)

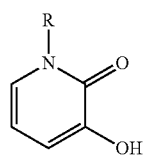
(3b)

where R is an organic groups such as an alkyl group. A metal ligand derived from a hydroxypyridinone comprises a hydroxypyridinone group and one or more reactive functional groups such as terminal thiol groups.

An "acetylacetonate group" refers to a group having the structure:

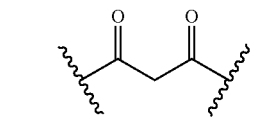 [SMILES: *C(=O)CC(*)=O]

In certain embodiments, an acetylacetonate refers to a metal chelating agent comprising an acetylacetonate ligand and one or more reactive functional groups. In certain embodiments, the one or more reactive functional groups can be reactive with a thiol group such as an epoxy group, an alkenyl group, a Michael acceptor group, or a group comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc.

"Quinones" refer to compounds having a fully conjugated cyclic dione structure derived from aromatic compounds by conversion of an even number of —CH= groups into —C(=O)— groups with any necessary rearrangement of double bonds. Examples of quinones include 1,2-benzoquinone, 1,4-benzoquinone, 1,4-naphthaloquinone, and 9,10-anthraquinone. Quinone groups can be metal ligands.

A "maleimide" refers to a compound having a maleimide group:

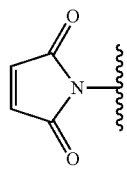 [SMILES: *N1C(=O)C=CC1=O]

A bismaleimide refers to a compound having two maleimide groups, where the two maleimide groups are bonded by the nitrogen atoms via a linker. Maleimide-terminated sulfur-containing prepolymers are disclosed in U.S. Application Publication No. 2015/0119549, which is incorporated by reference in its entirety.

A terminal bismaleimide moiety refers to a moiety having a terminal maleimide group. In certain embodiments, a terminal maleimide group is derived from a bismaleimide, such as a compound having the structure of Formula (4a):

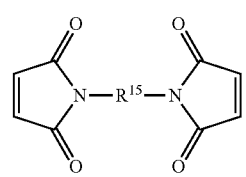
(4a)

where R$^{15}$ is a divalent organic moiety, and the terminal group has the structure of Formula (4b):

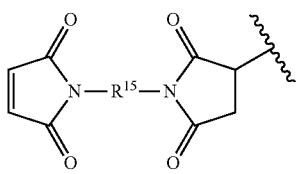

(4b)

and is referred to herein as a 1-(4-(4-(3-yl-2,5-dioxopyrrolidin-1-yl)benzyl)phenyl)-1H-pyrrole-2,5-dione group. In certain embodiments, a terminal maleimide group is derived from 1,1'-(methylenedi-4,1-phenylene)bismaleimide of Formula (5a), also referred to as 1,1'-(methylenebis(4,1-phenylene)bis(1H-pyrrole-2,5-dione), and the terminal group has the structure of Formula (5b):

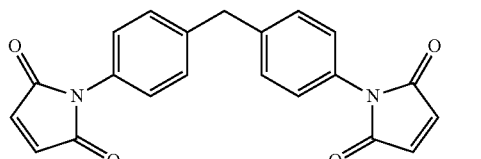

(5a)

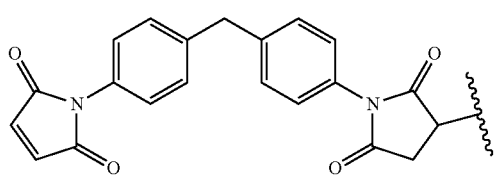

(5b)

In certain embodiments, a maleimide group comprises 1-(4-(4-(3-yl-2,5-dioxopyrrolidin-1-yl)benzyl)phenyl)-1H-pyrrole-2,5-dione group. In certain embodiments, each of the terminal maleimide groups may be the same and in certain embodiments, at least some of the terminal maleimide groups are different.

Other examples of compounds having two or more maleimide groups include ethylenebismaleimide; 1,6-bismaleimidohexane; 2,4-dimaleimidotoluene, N,N'-1,3-phenylenedimaleimide; 1,4-bis(maleimido)butane trimethylenebismaleimide; p,p'-dimaleimidodiphenylmethane; pentamethylenebismaleimide 1H-pyrrole-2,5-dione; 1,1'-(1,8-octanediyl)bis-, 1H-pyrrole-2,5-dione, 1,1'-(1,7-heptanediyl)bis-, 4,4'-dithiobis(phenylmaleimide); methylenebis(N-carbamylmaleimide), 1,9-bis(maleimide) nonane; 1,1'-decane-1,10-diylbis(1H-pyrrole-2,5-dione); O-phenylene dimaleimide, bis(N-maleimidomethyl)ether; 1,5-bis(maleimide)-2-methyl-pentane; N,N'-1,4-phenylenedimaleimide; 1,1'-(2-methyl-1,3-phenylene)bis(1H-pyrrole-2,5-dione); Kerimid 601 resin; tetrakis(N-2-aminoethyl-maleamide); 1-(2,5-dimethylphenyl)pyrrole-2,5-dione; SureCN331305, SureCN349749; or 1,1'-biphenyl-4,4'-diyl-bis(1H-pyrrole-2,5-dione).

A "bis(sulfonyl)alkanol" refers to a compound of the general formula $R^8—S(O)_2—R^{10}—CH(—OH)—R^{10}—S(O)_2—R^8$ where each $R^8$ is a moiety having a reactive functional group; and each $R^{10}$ is independently selected from $C_{1-3}$ alkanediyl. In certain embodiments, each $R^8$ comprises a terminal group reactive with a thiol group such as, for example, an alkenyl group, an epoxy group, a Michael acceptor group, or a group comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc. In certain embodiments, a bis(sulfonyl)alkanol may be a bis(vinylsulfonyl)alkanol comprising terminal alkenyl groups. In certain embodiments a bis(sulfonyl)alkanol may be a bis(vinylsulfonyl)alkanol in which $R^8$ comprises a terminal alkenyl group, such as a compound having the formula $CH_2=CH—S(O)_2—R^{10}—CH(—OH)—R^{10}—S(O)_2—CH=CH_2$. In certain embodiments, a bis(vinylsulfonyl)alkanol is 1,3-bis(vinylsulfonyl)-2-propanol. In certain embodiments, a bis(sulfonyl)alkanol containing compound can be prepared by reacting a bis(vinylsulfonyl)alkanol with a compound having a reactive terminal functional group and a terminal group reactive with the terminal alkenyl groups of the bis(vinylsulfonyl)alkanol such as a thiol group or an epoxy group. In such embodiments, the bis(sulfonyl)alkanol can have the structure $R^8—CH_2—CH_2—S(O)_2—R^{10}—CH(—OH)—R^{10}—S(O)_2—CH_2—CH_2—R^8$ where each $R^8$ is a moiety derived from the reaction of the compound with the terminal alkenyl groups of the bis(vinylsulfonyl)alkanol.

As used herein, "polymer" refers to oligomers, homopolymers, and copolymers, which may be cured or uncured. Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

"Prepolymers" refer to polymers prior to curing. In general, prepolymers provided by the present disclosure are liquid at room temperature. "Adducts" can refer to prepolymers that are functionalized with a reactive terminal group; however, prepolymers may also contain terminal functional group. Thus, the terms prepolymer and adduct are used interchangeably. The term adduct is often used to refer to a prepolymer that is an intermediate in a reaction sequence used to prepare a prepolymer.

"Polythioether" refers to a compound containing at least two thioether linkages, that is "—$CR_2$—S—$CR_2$—" groups. In addition to at least two thioether groups, polythioethers provided by the present disclosure may comprise at least two formal, acetal, and/or ketal groups, e.g., at least two —O—$CR_2$—O— groups, where each R is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl. In certain embodiments, such compounds are prepolymers or adducts. Suitable polythioethers are disclosed, for example, in U.S. Pat. No. 6,172,179, which is incorporated by reference in its entirety.

"Substituted" refers to a group in which one or more hydrogen atoms are each independently replaced with the same or different substituent(s). In certain embodiments, a substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, —C=O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, a substituent is chosen from —OH, —NH$_2$, and $C_{1-3}$ alkyl.

Reference is now made to certain embodiments of compositions comprising Michael acceptor-terminated sulfur-containing prepolymers, thiol-terminated sulfur-containing prepolymers and phosphine catalysts and methods of using such compositions. The disclosed embodiments are not intended to be limiting of the claims. To the contrary, the claims are intended to cover all alternatives, modifications, and equivalents.

Compositions provided by the present disclosure include a Michael acceptor-terminated sulfur-containing prepolymer, a thiol-terminated sulfur-containing prepolymer, and a phosphine catalyst. In certain embodiments, a phosphine catalyst comprises a controlled-release phosphine catalyst. The compound having at least two terminal groups reactive with Michael acceptor groups comprises a thiol-terminated a sulfur-containing prepolymer such as a thiol-terminated polythioether prepolymer. The compound having at least two Michael acceptor groups comprises a Michael acceptor-terminated sulfur-containing prepolymer such as a Michael acceptor-terminated polythioether prepolymer. In certain embodiments, at least one of the compounds terminated with groups reactive with Michael acceptor groups and the compound having at least two Michael acceptor groups comprises a polythioether prepolymer.

Michael addition chemistries may be employed in a variety of ways to provide curable compositions. For example, a curable composition provided by the present disclosure may comprise (a) a thiol-terminated sulfur-containing prepolymer and a Michael acceptor-terminated sulfur-containing prepolymer; (b) a thiol-terminated sulfur-containing prepolymer, a low molecular weight polythiol, and a Michael acceptor-terminated sulfur-containing prepolymer; or (c) a thiol-terminated sulfur-containing prepolymer, a Michael acceptor-terminated sulfur-containing prepolymer, and a low molecular weight compound having at least two Michael acceptor groups; and (d) a thiol-terminated sulfur-containing prepolymer, a low molecular weight polythiol, a Michael acceptor-terminated sulfur-containing prepolymer, and a low molecular weight compound having at least two Michael acceptor groups.

Michael acceptor-terminated sulfur-containing prepolymers and thiol-terminated sulfur-containing polymers may be derived from polythioethers, polysulfide, sulfur-containing polyformals, or combinations of any of the foregoing.

In certain embodiments, low molecular weight polythiols and low molecular weight Michael acceptors compounds having an average molecular weight less than about 400 Daltons, and in certain embodiments, less than about 1,000 Daltons.

Suitable thiol-terminated sulfur-containing prepolymers include thiol-terminated polythioethers, thiol-terminated polysulfides, thiol-terminated sulfur-containing polyformals, and combinations of any of the foregoing.

In certain embodiments, a thiol-terminated sulfur-containing prepolymer comprises a thiol-terminated polythioether comprising a backbone comprising the structure of Formula (6):

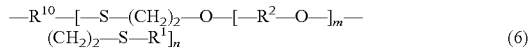

(6)

wherein, each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $—[(—CHR^3—)_p—X—]_q—(CHR^3)_r—$ group, wherein each $R^3$ is selected from hydrogen and methyl;

each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $—[(—CH_2—)_p—X—]_q—(CH_2)_r—$ group;

each X is independently selected from O, S, —NH—, and —N(—CH$_3$)—;

m ranges from 0 to 50;

n is an integer ranging from 1 to 60;

p is an integer ranging from 2 to 6;

q is an integer ranging from 1 to 5; and r is an integer ranging from 2 to 10.

In certain embodiments of a prepolymer of Formula (6), $R^1$ is $—[—(CHR^3)_s—X—]_q—(CHR^3)_r—$ wherein each X is independently selected from —O— and —S—. In certain embodiments wherein $R^1$ is $—[—(CHR^3)_s—X—]_q—(CHR^3)_r—$, each X is —O— and in certain embodiments, each X is —S—.

In certain embodiments of a prepolymer of Formula (6), $R^1$ is $—[—(CH_2)_s—X—]_q—(CH_2)_r—$ wherein each X is independently selected from —O— and —S—. In certain embodiments wherein $R^1$ is $—[—(CH_2)_s—X—]_q—(CH_2)_r—$, each X is —O— and in certain embodiments, each X is —S—.

In certain embodiments, $R^1$ in Formula (6) is $—[(—CH_2—)_p—X—]_q—(CH_2)_r—$, where p is 2, X is O, q is 2, r is 2, $R^2$ is ethanediyl, m is 2, and n is 9.

In certain embodiments of Formula (6), each $R^1$ is derived from dimercaptodioxaoctane (DMDO) and in certain embodiments, each $R^1$ is derived from dimercaptodiethylsulfide (DMDS).

In certain embodiments of Formula (6), each m is independently an integer from 1 to 3. In certain embodiments, each m is the same and is 1, 2, and in certain embodiments, 3.

In certain embodiments of Formula (6), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (6), each p is independently selected from 2, 3, 4, 5, and 6. In certain embodiments, each p is the same and is 2, 3, 4, 5, or 6.

In certain embodiments, a thiol-terminated sulfur-containing prepolymer comprises a thiol-terminated polythioether prepolymer. Examples of thiol-terminated polythioether prepolymers are disclosed, for example, in U.S. Pat. No. 6,172, 179. In certain embodiments, a thiol-functional polythioether adduct comprises Permapol® P3.1E, available from PRC-DeSoto International Inc., Sylmar, Calif.

In certain embodiments, a thiol-terminated sulfur-containing prepolymer comprises a thiol-terminated polythioether prepolymer selected from a thiol-terminated polythioether prepolymer of Formula (7a), a thiol-terminated polythioether prepolymer of Formula (7b), and a combination thereof:

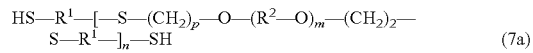

(7a)

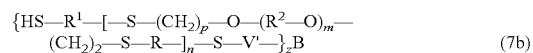

(7b)

wherein, each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein, s is an integer from 2 to 6;

q is an integer from 1 to 5;

r is an integer from 2 to 10;

each $R^3$ is independently selected from hydrogen and methyl; and each X is independently selected from —O—, —S—, —NH—, and —N(—CH$_3$)—;

each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are defined as for R$^1$;

m is an integer from 0 to 50;

n is an integer from 1 to 60;

p is an integer from 2 to 6;

B represents a core of a z-valent, polyfunctionalizing agent B(—V)$_z$ wherein, z is an integer from 3 to 6; and each V is a moiety comprising a terminal group reactive with a thiol; and each —V'— is derived from the reaction of —V with a thiol.

In certain embodiments, Formula (7a) and in Formula (7b), R$^1$ is —[(—CH$_2$—)$_p$—X—]q (CH$_2$)$_r$—, where p is 2, X is —O—, q is 2, r is 2, R$^2$ is ethanediyl, m is 2, and n is 9.

In certain embodiments of Formula (7a) and Formula (7b), R$^1$ is selected from C$_{2-6}$ alkanediyl and —[—(CHR$^3$)$_s$—X—]$_q$—(CHR$^3$)$_r$—.

In certain embodiments of Formula (7a) and Formula (7b), R$^1$ is —[—(CHR$^3$)$_s$—X—]$_q$—(CHR$^3$)$_r$—, and in certain embodiments X is —O— and in certain embodiments, X is —S—.

In certain embodiments of Formula (7a) and Formula (7b), where R$^1$ is —[—(CHR$^3$)$_s$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (7a and Formula (7b), where R$^1$ is —[—(CHR$^3$)$_s$—X—]$_q$ (CHR$^3$)$_r$—, each R$^3$ is hydrogen, and in certain embodiments, at least one R$^3$ is methyl.

In certain embodiments of Formula (7a) and Formula (7b), each R$^1$ is the same, and in certain embodiments, at least one R$^1$ is different.

Various methods can be used to prepare thiol-terminated polythioethers of Formula (7a) and Formula (7b). Examples of suitable thiol-terminated polythioethers, and methods for their production, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated by reference. Such thiol-terminated polythioethers may be difunctional, that is, linear polymers having two terminal thiol groups, or polyfunctional, that is, branched polymers have three or more terminal thiol groups. Suitable thiol-terminated polythioethers are commercially available, for example, as Permapol® P3.1E, from PRC-DeSoto International Inc., Sylmar, Calif.

A thiol-terminated sulfur-containing prepolymer may comprise a mixture of different thiol-terminated sulfur-containing prepolymer and the thiol-terminated sulfur-containing prepolymer may have the same or different functionality. In certain embodiments, a thiol-terminated sulfur-containing prepolymer has an average functionality from 2 to 6, from 2 to 4, from 2 to 3, and in certain embodiments, from 2.05 to 2.5. For example, a thiol-terminated sulfur-containing prepolymer can be selected from a difunctional thiol-terminated sulfur-containing prepolymer, a trifunctional thiol-terminated sulfur-containing prepolymer, and a combination thereof.

In certain embodiments, a thiol-terminated polythioether can be prepared by reacting a polythiol and a diene such as a divinyl ether, and the respective amounts of the reactants used to prepare the thiol-terminated polythioether are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a polyfunctionalizing agent may be reacted with (n) moles of a diene, such as a divinyl ether, or a mixture of at least two different dienes, such as a divinyl ether. In certain embodiments, a polyfunctionalizing agent is present in the reaction mixture in an amount sufficient to provide a thiol-terminated polythioether prepolymer having an average functionality of from 2.05 to 3, such as 2.1 to 2.8.

The reaction used to make a thiol-terminated polythioether prepolymer may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers prepolymers may be produced by reacting a divinyl ether or mixtures of divinyl ethers with an excess of dithiol or a mixtures of dithiols. Thus, in certain embodiments, a thiol-terminated polythioether comprises the reaction product of reactants comprising:

(a) a dithiol of Formula (8):

HS—R$^1$—SH    (8)

wherein,

R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_s$—X—]$_q$—(CHR$^3$)$_r$—;

wherein, each R$^3$ is independently selected from hydrogen and methyl;

each X is independently selected from —O—, —S—, —NH—, and —N(—CH$_3$)—;

s is an integer from 2 to 6;

q is an integer from 1 to 5; and r is an integer from 2 to 10; and (b) a divinyl ether of Formula (9):

CH$_2$=CH—O-[—R$^2$—O-]$_m$—CH=CH$_2$    (9)

wherein, each R$^2$ is independently selected from C$_{1-10}$ alkanediyl, C$_{6-8}$ cycloalkanediyl, C$_{6-14}$ alkanecycloalkanediyl, and —[—(CHR$^3$—)$_s$—X—]$_q$—(CHR$^3$—)$_r$—, wherein s, q, r, R$^3$, and X are as defined above;

m is an integer from 0 to 50;

n is an integer from 1 to 60; and p is an integer from 2 to 6.

And, in certain embodiments, the reactants may comprise (c) a polyfunctional compound such as a polyfunctional compound B(—V)$_z$, where B, —V, and z are defined herein.

In certain embodiments, dithiols suitable for use in preparing thiol-terminated polythioethers include those having Formula (8), other dithiols disclosed herein, or combinations of any of the dithiols disclosed herein. In certain embodiments, a dithiol has the structure of Formula (8):

HS—R$^1$—SH    (8)

wherein,

R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_s$—X—]$_q$—(CHR$^3$)$_r$—;

wherein, each $R^3$ is independently selected from hydrogen and methyl;
each X is independently selected from —O—, —S—, —NH—, and —N(—CH$_3$)—;
s is an integer from 2 to 6;
q is an integer from 1 to 5; and
r is an integer from 2 to 10.

In certain embodiments of a dithiol of Formula (8), $R^1$ is —[—(CHR$^3$)$_s$—X—]$_q$—(CHR$^3$)$_r$—.

In certain embodiments of a dithiol of Formula (8), X is selected from —O— and —S—, and thus —[—(CHR$^3$)$_s$—X—]$_q$—(CHR$^3$)$_r$— in Formula (8) is —[(—CHR$^3$—)$_s$—O—]$_q$—(CHR$^3$)$_r$— or —[(—CHR$^3{}_2$—)$_s$—S—]$_q$—(CHR$^3$)$_r$—. In certain embodiments, p and r are equal, such as where p and r are both two.

In certain embodiments of a dithiol of Formula (8), $R^1$ is selected from C$_{2-6}$ alkanediyl and —[—(CHR$^3$)$_s$—X—]$_q$—(CHR$^3$)$_r$—.

In certain embodiments of a dithiol of Formula (8), $R^1$ is —[—(CHR$^3$)$_s$—X—]$_q$—(CHR$^3$)$_r$—, and in certain embodiments X is —O—, and in certain embodiments, X is —S—.

In certain embodiments where $R^1$ is —[—(CHR$^3$)$_s$—X—]$_q$—(CHR$^3$)$_r$—, s is 2, r is 2, q is 1, and X is —S—; in certain embodiments, wherein s is 2, q is 2, r is 2, and X is —O—; and in certain embodiments, s is 2, r is 2, q is 1, and X is —O—.

In certain embodiments where $R^1$ is —[—(CHR$^3$)$_s$—X—]$_q$—(CHR$^3$)—, each $R^3$ is hydrogen, and in certain embodiments, at least one $R^3$ is methyl.

In certain embodiments of Formula (8), each $R^1$ is derived from dimercaptodioxaoctane (DMDO) and in certain embodiments, each $R^1$ is derived from dimercaptodiethylsulfide (DMDS).

In certain embodiments of Formula (8), each m is independently an integer from 1 to 3. In certain embodiments, each m is the same and is 1, 2, and in certain embodiments, 3.

In certain embodiments of Formula (8), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (8), each p is independently selected from 2, 3, 4, 5, and 6. In certain embodiments, each p is the same and is 2, 3, 4, 5, or 6.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A dithiol may have one or more pendant groups selected from a lower (e.g., C$_{1-6}$) alkyl group, a lower alkoxy group, and a hydroxy group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (8), $R^1$ is —[(—CH$_2$—)$_s$—X—]$_q$—(CH$_2$)$_r$—, wherein s is 2, r is 2, q is 1, and X is —S—); dimercaptodioxaoctane (DMDO) (in Formula (8), $R^1$ is —[(—CH$_2$—)$_s$—X—]$_q$—(CH$_2$)$_r$—, wherein s is 2, q is 2, r is 2, and X is —O—); and 1,5-dimercapto-3-oxapentane (in Formula (8), $R^1$ is —[(—CH$_2$—)$_s$—X—]$_q$—(CH$_2$)$_r$—, wherein s is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing polythioethers include, for example, divinyl ethers of Formula (9):

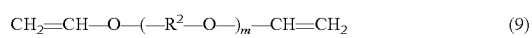

$$CH_2=CH-O-(-R^2-O-)_m-CH=CH_2 \qquad (9)$$

where $R^2$ in Formula (9) is selected from a C$_{2-6}$ n-alkanediyl group, a C$_{3-6}$ branched alkanediyl group, a C$_{6-8}$ cycloalkanediyl group, a C$_{6-10}$ alkanecycloalkanediyl group, and —[(—CH$_2$—)$_s$—O—]$_q$—(—CH$_2$—)$_r$-, where s is an integer ranging from 2 to 6, q is an integer from 1 to 5, and r is an integer from 2 to 10. In certain embodiments of a divinyl ether of Formula (9), $R^2$ is a C$_{2-6}$ n-alkanediyl group, a C$_{3-6}$ branched alkanediyl group, a C$_{6-8}$ cycloalkanediyl group, a C$_{6-10}$ alkanecycloalkanediyl group, and in certain embodiments, —[(—CH$_2$—)$_s$—O-]$_q$—(—CH$_2$—)$_r$—.

Suitable divinyl ethers include, for example, compounds having at least one oxyalkanediyl group, such as from 1 to 4 oxyalkanediyl groups, i.e., compounds in which m in Formula (9) is an integer ranging from 1 to 4. In certain embodiments, m in Formula (9) is an integer ranging from 2 to 4. It is also possible to employ commercially available divinyl ether mixtures that are characterized by a non-integral average value for the number of oxyalkanediyl units per molecule. Thus, m in Formula (9) can also take on rational number values ranging from 0 to 10.0, such as from 1.0 to 10.0, from 1.0 to 4.0, or from 2.0 to 4.0.

Examples of suitable vinyl ethers include, divinyl ether, ethylene glycol divinyl ether (EG-DVE) ($R^2$ in Formula (9) is ethanediyl and m is 1), butanediol divinyl ether (BD-DVE) ($R^2$ in Formula (9) is butanediyl and m is 1), hexanediol divinyl ether (HD-DVE) ($R^2$ in Formula (9) is hexanediyl and m is 1), diethylene glycol divinyl ether (DEG-DVE) ($R^2$ in Formula (9) is ethanediyl and m is 2), triethylene glycol divinyl ether ($R^2$ in Formula (9) is ethanediyl and m is 3), tetraethylene glycol divinyl ether ($R^2$ in Formula (9) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxy groups, alkoxy groups, and amine groups.

In certain embodiments, divinyl ethers in which $R^2$ in Formula (9) is C$_{3-6}$ branched alkanediyl may be prepared by reacting a polyhydroxy compound with acetylene. Examples of divinyl ethers of this type include compounds in which $R^2$ in Formula (9) is an alkyl-substituted methanediyl group such as —CH(—CH$_3$)—, for which $R^2$ in Formula (9) is ethanediyl and m is 3 or an alkyl-substituted ethanediyl.

Other useful divinyl ethers include compounds in which $R^2$ in Formula (9) is polytetrahydrofuryl (poly-THF) or polyoxyalkanediyl, such as those having an average of about 3 monomer units.

Two or more types of polyvinyl ether monomers of Formula (9) may be used. Thus, in certain embodiments, two dithiols of Formula (8) and one polyvinyl ether monomer of Formula (9), one dithiol of Formula (8) and two polyvinyl ether monomers of Formula (9), two dithiols of Formula (8) and two divinyl ether monomers of Formula (9), and more than two compounds of one or both Formula (8) and Formula (9), may be used to produce a variety of thiol-terminated polythioethers.

In certain embodiments, a polyvinyl ether monomer comprises 20 to less than 50 mole percent of the reactants used to prepare a thiol-terminated polythioether, and in certain embodiments, to less than 50 mole percent.

In certain embodiments provided by the present disclosure, relative amounts of dithiols and divinyl ethers are selected to yield polythioethers having terminal thiol groups. Thus, a dithiol of Formula (8) or a mixture of at least two different dithiols of Formula (8), can be reacted with of a divinyl ether of Formula (9) or a mixture of at least two different divinyl ethers of Formula (9) in relative amounts such that the molar ratio of thiol groups to alkenyl groups is greater than 1:1, such as from 1.1 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioethers may be prepared by combining at least one dithiol of Formula (8) and at least one divinyl ether of Formula (9) followed by addition of an appropriate catalyst, and carrying out the reaction at a temperature from 30° C. to 120° C., such as 70° C. to 90° C., for a time from 2 hours to 24 hours, such as 2 hours to 6 hours.

As disclosed herein, thiol-terminated polythioethers may comprise a polyfunctional thiol-terminated polythioether, i.e., may have an average functionality of greater than 2.0. Suitable polyfunctional thiol-terminated polythioethers include, for example, those having the structure of Formula (10):

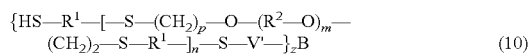

{HS—R$^1$—[—S—(CH$_2$)$_p$—O—(R$^2$—O)$_m$—(CH$_2$)$_2$—S—R$^1$—]$_n$—S—V'—}$_z$B  (10)

wherein z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Application Publication No. 2010/0010133 at paragraphs [0102]—[0105], the cited portion of which is incorporated by reference, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, thiol-terminated polythioethers may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Polysulfides refer to prepolymers that contain one or more sulfide linkages, i.e., —S$_x$-linkages, where x is from 2 to 4, in the polymer backbone and/or in pendant positions on the prepolymer chain. In certain embodiments, a polysulfide prepolymer will have two or more sulfur-sulfur linkages. Suitable thiol-terminated polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. Examples of suitable thiol-terminated polysulfides are disclosed, for example, in U.S. Pat. No. 4,623,711.

Thiol-terminated sulfur-containing polyformal prepolymers useful in aerospace sealant applications are disclosed, for example, in U.S. Application Publication No. 2012/0234205 and in U.S. Application Publication No. 2012/0238707, each of which is incorporated by reference in its entirety.

In certain embodiments, thiol-terminated sulfur-containing prepolymer comprises a metal ligand-containing thiol-terminated sulfur-containing prepolymer in which a metal ligand is incorporated into the backbone of the prepolymer. Metal ligand-containing sulfur-containing prepolymers are disclosed in U.S. Application Publication No. 2014/0275474, U.S. Application Publication No. 2014/0378650, and U.S. Application Publication No. 2014/0378649, each of which is incorporated by reference in its entirety.

Michael acceptor-terminated sulfur-containing prepolymers have at least two terminal unsaturated groups that are activated for Michael addition such as activated unsaturated groups that serve as a Michael addition acceptor.

Michael acceptor-terminated sulfur-containing prepolymers comprise at least two terminal Michael acceptor groups. In certain embodiments, a Michael-acceptor-terminated sulfur-containing prepolymer may be difunctional, and in certain embodiments, may have a functionality greater than 2 such as 3, 4, 5, or 6. A Michael-acceptor-terminated sulfur-containing prepolymer may comprise a mixture of Michael-acceptor-terminated sulfur-containing prepolymer having different functionalities characterized by an average functionality from 2.05 to 6, from 2.1 to 4, from 2.1 to 3, from 2.2 to 2.8, and in certain embodiments, from 2.4 to 2.6. Michael-acceptor-terminated sulfur-containing prepolymer have at least two terminal Michael acceptor groups, and in certain embodiments have two Michael acceptor groups, 3, 4, 5, or 6 Michael acceptor groups. A Michael-acceptor-terminated sulfur-containing prepolymer may comprise a combination of adducts having different numbers of terminal Michael acceptor groups characterized, for example, by an average Michael acceptor functionality of from 2.05 to 6, from 2.1 to 4, from 2.1 to 3, from 2.2 to 2.8, and in certain embodiments, from 2.4 to 2.6.

Suitable Michael acceptor-terminated sulfur-containing prepolymers include Michael acceptor-terminated polythioethers, Michael acceptor-terminated polysulfides, Michael acceptor-terminated sulfur-containing polyformals, and combinations of any of the foregoing. For example, any of the polythioethers, polysulfides, and sulfur-containing polyformals suitable for use as thiol-terminated sulfur-containing prepolymers may also be used as the backbone for a Michael acceptor-terminated sulfur-containing prepolymer.

Michael acceptor-terminated sulfur-containing prepolymers suitable for use in aerospace sealant applications are disclosed, for example, in U.S. Application Publication No. 2014/0378649, U.S. Application Publication No. 2015, and U.S. Application Publication No. 2014/0378649, each of which is incorporated by reference in its entirety.

In certain embodiments, a Michael acceptor-terminated sulfur-containing prepolymer comprises a Michael acceptor-terminated polythioether.

In certain embodiments, a Michael acceptor-terminated sulfur-containing prepolymer comprises a Michael acceptor-terminated polythioether comprising:

(a) a backbone comprising the structure of Formula (6):

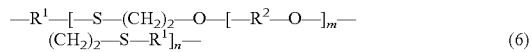

$-R^1-[-S-(CH_2)_2-O-[-R^2-O-]_m-(CH_2)_2-S-R^1]_n-$ (6)

where (i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $-[(-CHR^3-)_p-X-]_q-(CHR^3-)_r-$ group, wherein each $R^3$ is independently selected from hydrogen and methyl; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $-[(-CH-)_p-X-]_q-(CH_2)_r-$ group; (iii) each X is independently selected from O, S, and a $-NR^6-$ group, in which $R^6$ is selected from H and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two terminal Michael acceptor groups.

In certain embodiments of a compound of Formula (6), $R^1$ is $-[-(CHR^3)_s-X-]_q-(CHR^3)_r-$ wherein each X is independently selected from $-O-$ and $-S-$. In certain embodiments wherein $R^1$ is $-[-(CHR^3)_s-X-]_q-(CHR^3)_r-$, each X is $-O-$ and in certain embodiments, each X is $-S-$.

In certain embodiments of a compound of Formula (6), $R^1$ is $-[-(CH_2)_s-X-]_q-(CH_2)_r-$ wherein each X is independently selected from $-O-$ and $-S-$. In certain embodiments wherein $R^1$ is $-[-(CH_2)_s-X-]_q-(CH_2)_r-$, each X is $-O-$ and in certain embodiments, each X is $-S-$.

In certain embodiments, $R^1$ in Formula (6) is $-[(-CH_2-)_p-X-]_q-(CH_2)_r-$, where p is 2, X is O, q is 2, r is 2, $R^2$ is ethanediyl, m is 2, and n is 9.

In certain embodiments, a Michael acceptor-terminated sulfur-containing prepolymer comprises a Michael acceptor-terminated polythioether of Formula (11a), a Michael acceptor-terminated polythioether of Formula (11b), or a combination thereof:

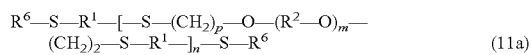

$R^6-S-R^1-[-S-(CH_2)_p-O-(R^2-O)_m-(CH_2)_2-S-R^1]_n-S-R^6$ (11a)

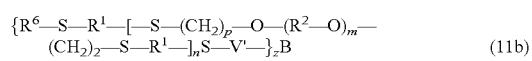

$\{R^6-S-R^1-[-S-(CH_2)_p-O-(R^2-O)_m-(CH_2)_2-S-R^1]_n S-V'-\}_z B$ (11b)

wherein:

each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(-CHR^3-)_s-X-]_q-(-CHR^3-)_r-$, wherein:

s is an integer from 2 to 6;
q is an integer from 1 to 5;
r is an integer from 2 to 10;
each $R^3$ is independently selected from hydrogen and methyl; and
each X is independently selected from $-O-$, $-S-$, $-NH-$, and $-N(-CH_3)-$;
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined for $R^1$;
m is an integer from 0 to 50;
n is an integer from 1 to 60;
p is an integer from 2 to 6;
B represents a core of a z-valent, polyfunctionalizing agent $B(-V)_z$ wherein:
z is an integer from 3 to 6; and
each V is a group comprising a terminal group reactive with thiol groups; and each $-V'-$ is derived from the reaction of $-V$ with a thiol; and
each $R^6$ is independently a moiety comprising a terminal Michael acceptor group.

In certain embodiments of Formula (11a) and in Formula (11b), $R^1$ is $-[(-CH_2-)_p-X-]_q-(CH_2)_r-$, where p is 2, X is $-O-$, q is 2, r is 2, $R^2$ is ethanediyl, m is 2, and n is 9.

In certain embodiments of Formula (11a) and Formula (11b), $R^1$ is selected from $C_{2-6}$ alkanediyl and $-[(-CHR^3)_s-X-]_q-(CHR^3)-$.

In certain embodiments of Formula (11a) and Formula (11b), $R^1$ is $-[(-CHR^3)_s-X-]_q-(CHR^3)_r-$, and in certain embodiments X is $-O-$ and in certain embodiments, X is $-S-$.

In certain embodiments of Formula (11a) and Formula (11b), where $R^1$ is $-[(-CHR^3)_s-X-]_q-(CHR^3)_r-$, p is 2, r is 2, q is 1, and X is $-S-$; in certain embodiments, wherein p is 2, q is 2, r is 2, and X is $-O-$; and in certain embodiments, p is 2, r is 2, q is 1, and X is $-O-$.

In certain embodiments of Formula (11a) and Formula (11b), where $R^1$ is $-[(-CHR^3)_s-X-]_q-(CHR^3)_r-$, each $R^3$ is hydrogen, and in certain embodiments, at least one $R^3$ is methyl.

In certain embodiment of adducts of Formula (11a) and Formula (11b), each $R^1$ is the same, and in certain embodiments, at least one $R^1$ is different.

In certain embodiments, each $-V$ comprises a terminal alkenyl group.

A Michael acceptor group terminating a sulfur-containing prepolymer may be any suitable Michael acceptor group. In certain embodiments, the terminal Michael acceptor groups are derived from a bis(vinylsulfonyl)alkanol, and in certain embodiments, are derived from a bismaleimide.

In certain embodiments of prepolymers of Formula (11a) and Formula (11b), each $R^6$ is derived from a bismaleimide such as 1,1'-(methylenebis(4,1-phenylene)bis(1H-pyrrole-2,5-dione). In certain embodiments, each $R^6$ is derived from ethylenebismaleimide, 1,6-bismaleimidohexane, 2,4-dimaleimidotoluene, N,N'-1,3-phenylenedimaleimide; 1,4-bis(maleimido)butane trimethylenebismaleimide; p,p'-dimaleimidodiphenylmethane; pentamethylenebismaleimide 1H-pyrrole-2,5-dione; 1,1'-(1,8-octanediyl)bis-, 1H-pyrrole-2,5-dione, 1,1'-(1,7-heptanediyl)bis-, 4,4'-dithiobis(phenylmaleimide); methylenebis(N-carbamylmaleimide), 1,9-bis(maleimide)nonane; 1,1'-decane-1,10-diylbis(1H-pyrrole-2,5-dione); O-phenylene dimaleimide, bis(N-maleimidomethyl)ether; 1,5-bis(maleimide)-2-methylpentane; N,N'-1,4-phenylenedimaleimide; 1,1'-(2-methyl-1, 3-phenylene)bis(1H-pyrrole-2,5-dione); Kerimid 601 resin; tetrakis(N-2-aminoethylmaleamide); 1-(2,5-dimethylphenyl)pyrrole-2,5-dione; SureCN331305; SureCN349749; or 1,1'-biphenyl-4,4'-diylbis(1H-pyrrole-2,5-dione).

In certain embodiments of a Michael acceptor-terminated sulfur-containing prepolymer the prepolymer comprises at least two terminal maleimide groups.

Michael acceptor groups are well known in the art. In certain embodiments, a Michael acceptor group comprises an activated alkene, such as an alkenyl group proximate to an electron-withdrawing group such as an enone, nitro, halo, nitrile, carbonyl, or nitro group. In certain embodiments, a Michael acceptor group is selected from a vinyl ketone, a vinyl sulfone, and a quinone. In certain embodiments, a Michael acceptor group comprises a bis(sulfonyl)alkanol group such as a 1-(ethylenesulfonyl)-n-(vinylsulfonyl)alkanol group, and in certain embodiments, a 1-(ethylenesulfonyl)-3-(vinylsulfonyl)propan-2-ol group. In certain embodiments, each of the Michael acceptor groups may be the same and in certain embodiments, at least some of the Michael acceptor groups are different.

In certain embodiments, Michael acceptor-terminated sulfur-containing prepolymers may comprise at least two terminal 1-(ethylenesulfonyl)-n-(vinylsulfonyl)alkanol groups, such as. two terminal 1-(ethylenesulfonyl)-n-(vinylsulfonyl) alkanol groups, 3, 4, 5, or 6 terminal 1-(ethylenesulfonyl)-n-(vinylsulfonyl)alkanol groups. A Michael acceptor-terminated sulfur-containing prepolymer may comprise a combination of adducts having different numbers of terminal 1-(ethylenesulfonyl)-n-(vinylsulfonyl)alkanol groups characterized, for example, by an average 1-(ethylenesulfonyl)-n-(vinylsulfonyl)alkanol functionality from 2.05 to 6, from 2.1 to 4, from 2.1 to 3, from 2.2 to 2.8, and in certain embodiments, from 2.4 to 2.6.

In certain embodiments, a Michael acceptor group is derived from a vinyl sulfone and has the structure of Formula (12):

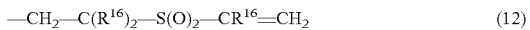
$$-CH_2-C(R^{16})_2-S(O)_2-CR^{16}=CH_2 \quad (12)$$

wherein each $R^{16}$ is independently selected from hydrogen and $C_{1-3}$ alkyl. In certain embodiments of Formula (12), each $R^{13}$ is hydrogen. In certain embodiments, Michael acceptor-terminated bis(sulfonyl)alkanol-containing polythioethers may be prepared, for example, by reacting a thiol-terminated bis(sulfonyl)alkanol-containing polythioether with a compound having a terminal Michael acceptor group and a group reactive with thiol groups such as a divinylsulfone, in the presence of a phosphine catalyst. Michael acceptor/polythioether chemistries and compounds are disclosed in U.S. Application Publication No. 2013/0345371, which is incorporated by reference in its entirety.

In certain embodiments, a Michael acceptor group is derived from a bis(sulfonyl)alkanol and has the structure of Formula (13a) or Formula (13b):

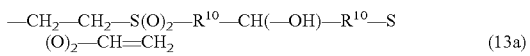
$$-CH_2-CH_2-S(O)_2-R^{10}-CH(-OH)-R^{10}-S(O)_2-CH=CH_2 \quad (13a)$$

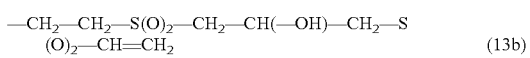
$$-CH_2-CH_2-S(O)_2-CH_2-CH(-OH)-CH_2-S(O)_2-CH=CH_2 \quad (13b)$$

where each $R^{10}$ is independently selected from $C_{1-3}$ alkanediyl.

In certain embodiments, each —V comprises a terminal alkenyl group.

In certain embodiments of adducts of Formula (11) and Formula (11a), each $R^6$ is independently selected from a vinyl ketone, a vinyl sulfone, and a quinone. In certain embodiments, each of the Michael acceptor groups may be the same and in certain embodiments, at least some of the Michael acceptor groups are different.

In certain embodiments, each $R^6$ is independently a bis(sulfonyl)alkanol group.

In certain embodiments of adducts of Formula (11) and Formula (11a), each $R^6$ is independently derived from a bis(sulfonyl)alkanol and has the structure of Formula (13a) or Formula (13b):

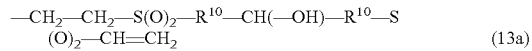
$$-CH_2-CH_2-S(O)_2-R^{10}-CH(-OH)-R^{10}-S(O)_2-CH=CH_2 \quad (13a)$$

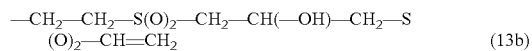
$$-CH_2-CH_2-S(O)_2-CH_2-CH(-OH)-CH_2-S(O)_2-CH=CH_2 \quad (13b)$$

where each $R^{10}$ is independently selected from $C_{1-3}$ alkanediyl.

In certain embodiments of a Michael acceptor-terminated sulfur-containing prepolymer the prepolymer comprises at least two terminal vinylsulfonyl groups.

In certain embodiments, a Michael acceptor-terminated sulfur-containing prepolymer may be terminated in at least two vinyl sulfonyl groups and in certain embodiments, at least two terminal 1-(ethylenesulfonyl)-n-(vinylsulfonyl)alkanol groups.

In certain embodiments a compound having a Michael acceptor group and a group that is reactive with the terminal groups of the sulfur-containing polymer may be a bis(sulfonyl)alkanol having the formula $R-CH_2-CH_2-S(O)_2-R^{10}-CH(-OH)-R^{10}-S(O)_2-CH=CH_2$ where R is a moiety having a terminal group that is reactive with the terminal groups of the sulfur-containing polymer; and each $R^{10}$ is independently selected from $C_{1-3}$ alkanediyl. In certain embodiments, the bis(vinyl)alkanol is a bis(vinylsulfonyl) alkanol.

Sulfur-containing maleimide adducts provided by the present disclosure comprise at least two terminal maleimide groups. Sulfur-containing prepolymers and adducts include, for example, polythioethers, polysulfides, sulfur-containing polyformals, and combinations thereof. Examples of suitable polythioethers are disclosed, for example, in U.S. Pat. No. 6,123,179. Examples of suitable polysulfides are disclosed, for example, in U.S. Pat. No. 4,623,711. In certain embodiments, a sulfur-containing maleimide adduct may be difunctional, and in certain embodiments, may have a functionality greater than 2 such as 3, 4, 5, or 6. A sulfur-containing maleimide adduct may comprise a mixture of sulfur-containing maleimide adducts having different functionalities characterized by an average functionality from 2.05 to 6, from 2.1 to 4, from 2.1 to 3, from 2.2 to 2.8, and in certain embodiments, from 2.4 to 2.6. Sulfur-containing maleimide adducts have at least two terminal maleimide groups, and in certain embodiments have two terminal 1-(4-(4-(3-yl-2,5-dioxopyrrolidin-1-yl)benzyl)phenyl)-1H-pyrrole-2,5-dione groups, and in certain embodiments have more than two terminal groups such as 3, 4, 5, or 6 terminal 1-(4-(4-(3-yl-2,5-dioxopyrrolidin-1-yl)benzyl)phenyl)-1H-pyrrole-2,5-dione groups. A sulfur-containing maleimide adduct may comprise a combination of adducts having different numbers of terminal 1-(4-(4-(3-yl-2,5-dioxopyrrolidin-1-yl)benzyl)phenyl)-1H-pyrrole-2,5-dione groups characterized, for example, by an average 1-(4-(4-(3-yl-2,5-dioxopyrrolidin-1-yl)benzyl)phenyl)-1H-pyrrole-2,5-dione functionality from 2.05 to 6, from 2.1 to 4, from 2.1 to 3, from 2.2 to 2.8, and in certain embodiments, from 2.4 to 2.6.

The double bond of maleimides can react with thiol groups at pH 6.5 to 7.5 and is more reactive than (meth)acrylates. At neutral pH, the reaction of maleimides with thiols is about 1,000 times faster than the reaction of maleimides with amines. Advanced compositions prepared from maleimide resins exhibit excellent thermomechanical stability and anti-flammability.

In certain embodiments, a maleimide-terminated sulfur-containing prepolymer comprises a polythioether maleimide prepolymer characterized by a polythioether having at least two terminal maleimide groups such as, for example, at least two terminal 1-(4-(4-(3-yl-2,5-dioxopyrrolidin-1-yl)benzyl)phenyl)-1H-pyrrole-2,5-dione groups.

In certain embodiments, the terminal Michael acceptor groups are selected from 1,3-bis(vinylsulfonyl-2-propanol, 1,1'-(methylenedi-4,1-phenylene)bismaleimide, or a combination thereof.

In certain embodiments of prepolymers of Formula (8a) and Formula (8b), each $R^6$ is independently derived from a bismaleimide. In certain embodiments, each of the terminal maleimide moieties may be the same and in certain embodiments, at least some of the terminal maleimide moieties are different. In certain embodiments, each $R^6$ is 1-(4-(4-(3-yl-2,5-dioxopyrrolidin-1-yl)benzyl)phenyl)-1H-pyrrole-2,5-dione.

In certain embodiments, a sulfur-containing maleimide adduct comprises a polythioether maleimide adduct comprising:

(a) a backbone comprising the structure of Formula (6):

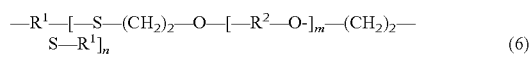

where (i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $—[(—CHR^3—)_p—X—]_q—(CHR^3)_r—$ group, wherein each $R^3$ is independently selected from hydrogen and methyl; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $—[(—CH—)_p—X—]_q—(CH_2)_r—$ group; (iii) each X is independently selected from O, S, and a $—NR^6—$ group, in which $R^6$ is selected from H and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two terminal maleimide groups.

In certain embodiments of a compound of Formula (6), $R^1$ is $—[—(CHR^3)_s—X—]_q—(CHR^3)_r—$ wherein each X is independently selected from —O— and —S—. In certain embodiments wherein $R^1$ is $—[—(CHR^3)_s—X—]_q—(CHR^3)_r—$, each X is —O— and in certain embodiments, each X is —S—.

In certain embodiments of a compound of Formula (6), $R^1$ is $—[—(CH_2)_s—X—]_q—(CH_2)_r—$ wherein each X is independently selected from —O— and —S—. In certain embodiments wherein $R^1$ is $—[—(CH_2)_s—X—]_q—(CH_2)_r—$, each X is —O— and in certain embodiments, each X is —S—.

In certain embodiments, $R^1$ in Formula (6) is $—[(—CH_2—)_p—X—]_q—(CH_2)_r—$, where p is 2, X is O, q is 2, r is 2, $R^2$ is ethanediyl, m is 2, and n is 9.

A terminal maleimide group has the structure of Formula (12):

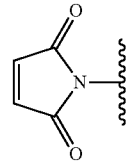

A terminal bismaleimide moiety refers to a moiety having a terminal maleimide group. In certain embodiments, a terminal maleimide group is derived from a bismaleimide, such as a compound having the structure of Formula (4a):

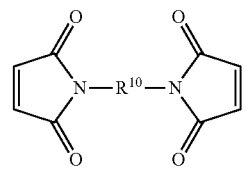

where $R^{10}$ is a divalent organic moiety, and the terminal group has the structure of Formula (4b):

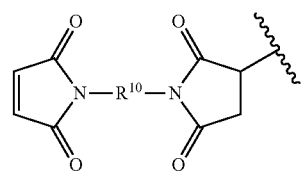

and is referred to herein as a 1-(4-(4-(3-yl-2,5-dioxopyrrolidin-1-yl)benzyl)phenyl)-1H-pyrrole-2,5-dione group. In certain embodiments, a terminal maleimide group is derived from 1,1'-(methylenedi-4,1-phenylene)bismaleimide of Formula (5a), also referred to as 1,1'-(methylenebis(4,1-phenylene)bis(1H-pyrrole-2,5-dione), and the terminal group has the structure of Formula (5b):

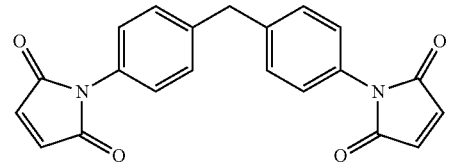

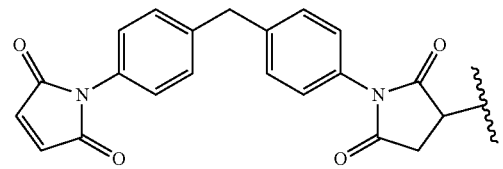

In certain embodiments, a maleimide group comprises 1-(4-(4-(3-yl-2,5-dioxopyrrolidin-1-yl)benzyl)phenyl)-1H-pyrrole-2,5-dione group. In certain embodiments, each of the terminal maleimide groups may be the same and in certain embodiments, at least some of the terminal maleimide groups are different.

Other examples of compounds having two or more maleimide groups include ethylenebismaleimide; 1,6-bismaleimidohexane; 2,4-dimaleimidotoluene, N,N'-1,3-phenylenedimaleimide; 1,4-bis(maleimido)butane trimethylenebismaleimide; p,p'-dimaleimidodiphenylmethane; pentamethylenebismaleimide 1H-pyrrole-2,5-dione; 1,1'-(1,8-octanediyl)bis-, 1H-pyrrole-2,5-dione, 1,1'-(1,7-heptanediyl)bis-, 4,4'-dithiobis(phenylmaleimide); methylenebis(N-carbamylmaleimide), 1,9-bis(maleimide) nonane; 1,1'-decane-1,10-diylbis(1H-pyrrole-2,5-dione); O-phenylene dimaleimide, bis(N-maleimidomethyl)ether; 1,5-bis(maleimide)-2-methyl-pentane; N,N'-1,4-phenylenedimaleimide; 1,1'-(2-methyl-1,3-phenylene)bis(1H-pyrrole-2,5-dione); Kerimid 601 resin; tetrakis(N-2-aminoethyl-maleamide); 1-(2,5-dimethylphenyl)pyrrole-2,5-dione; SureCN331305, SureCN349749; or 1,1'-biphenyl-4,4'-diyl-bis(1H-pyrrole-2,5-dione).

To prepare a Michael acceptor-terminated sulfur-containing prepolymer, a sulfur-containing polymer such as those disclosed herein may be reacted with a compound having a Michael acceptor group and a group that is reactive with the terminal groups of the sulfur-containing prepolymer.

In certain embodiments, a Michael acceptor group is selected from a vinyl ketone, a vinyl sulfone, a maleimide, and a quinone, a. In certain embodiments, a Michael acceptor group is a vinyl ketone, and in certain embodiments, a vinyl sulfone such as derived from divinyl sulfone. In embodiments in which the compound having a Michael acceptor group is derived from divinyl sulfone, the sulfur-containing polymer may be thiol-terminated such as a thiol-terminated polythioether, a thiol-terminated polysulfide, or a combination thereof.

In certain embodiments, a Michael acceptor group is a bis(sulfonyl)alkanol such as a group derived from a bis(vinylsulfonyl) alkanol. In embodiments in which the compound having a Michael acceptor group is derived from bis(vinylsulfonyl)alkanol the sulfur-containing polymer may be thiol-terminated such as a thiol-terminated polythioether, a thiol-terminated polysulfide, or a combination thereof.

The reaction between a sulfur-containing polymer and a compound having a Michael acceptor group and a group that is reactive with a terminal group of the sulfur-containing polymer can be performed in the presence of an appropriate catalyst.

In certain embodiments, compositions provided by the present disclosure comprise a catalyst such as an amine catalyst. For example, in embodiments in which the sulfur-containing polymer is thiol-terminated and the compound is a difunctional Michael acceptor, the reaction may take place in the presence of an amine catalyst. Examples of suitable amine catalysts include, for example, triethylenediamine (1,4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

In certain embodiments, a Michael acceptor-terminated sulfur-containing prepolymer comprises a Michael acceptor urethane-containing prepolymer. Michael acceptor-terminated urethane-containing prepolymers are disclosed in U.S. application Ser. No. 14/200,569, filed on Mar. 7, 2014, which is incorporated by reference in its entirety.

Michael acceptor-terminated urethane-containing prepolymers comprise urethanes incorporated into the backbone of a sulfur-containing prepolymer. The Michael acceptor-terminated urethane-containing prepolymers are useful in providing cured sealants having enhanced tensile strength.

For certain applications, Michael acceptor-terminated urethane-containing prepolymers represent an improvement over previously disclosed Michael acceptor-terminated sulfur-containing prepolymers such as those disclosed in U.S. Application Publication No. 2013/0345371 and U.S. Application Publication No. 2013/0345389. Cured sealants prepared from Michael acceptor-terminated urethane-containing prepolymers exhibit enhanced tensile strength and surface adhesion compared to the Michael acceptor-terminated sulfur-containing prepolymers disclosed in those applications. The enhanced tensile strength is believed to be imparted by the incorporation of urethane segments into the polymer backbone and the improved surface adhesion is believed to result from termination with groups that function as both metal ligands and as Michael acceptors.

Michael acceptor-terminated urethane-containing prepolymers comprise a urethane- and sulfur-containing backbone capped with isocyanate groups that are further capped with Michael acceptor groups.

Michael acceptor-terminated urethane-containing prepolymers include polythioethers, polysulfides, and combinations of any of the foregoing.

It can be appreciated that Michael acceptor-terminated urethane-containing prepolymers may be synthesized by a number of routes. The functional groups of the precursors can be adapted and selected for a particular reaction chemistry. For example, in certain embodiments, it can be convenient that the sulfur-containing prepolymer comprise thiol or hydroxy functional groups. In embodiments in which the sulfur-containing prepolymer has functional hydroxy groups, a diisocyanate may be directly reacted with the sulfur-containing prepolymer. In embodiments in which the precursor sulfur-containing prepolymer is thiol-terminated. the thiol groups may be capped with a hydroxy functional compound to provide a hydroxy-terminated sulfur-containing prepolymer that may then be reacted with a diisocyanate.

In certain embodiments, a Michael acceptor-terminated urethane-containing prepolymer comprises a Michael acceptor-terminated urethane-containing prepolymer of Formula (13a), a Michael acceptor-terminated urethane-containing prepolymer of Formula (13b), or a combination thereof:

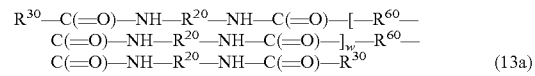

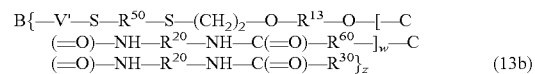

wherein,
w is an integer from 1 to 100;
each $R^{13}$ independently comprises $C_{2-10}$ alkanediyl;
each $R^{20}$ independently comprises a core of a diisocyanate;
each $R^{30}$ independently comprises at least one terminal Michael acceptor group;
each $R^{50}$ independently comprises a core of a sulfur-containing prepolymer;
each $R^{60}$ independently comprises a moiety having the structure of Formula (14):

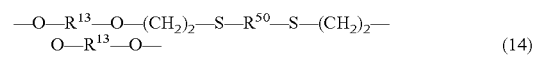

B represents a core of a z-valent, polyfunctionalizing agent B(—V)$_z$ wherein, z is an integer from 3 to 6; and each V is a moiety comprising a terminal group reactive with a thiol group; and each —V'— is derived from the reaction of —V with a thiol.

In certain embodiments, each R$^{50}$ is derived from a polythioether and has the structure of Formula (6):

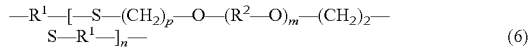

wherein, each R$^1$ independently is selected from C$_{2-10}$ alkanediyl, C$_{6-8}$ cycloalkanediyl, C$_{6-14}$ alkanecycloalkanediyl, C$_{5-8}$ heterocycloalkanediyl, and —[(—CHR$^3$—)$_s$—X—]$_q$—(—CHR$^3$—)$_r$—, wherein, s is an integer from 2 to 6;
q is an integer from 1 to 5;
r is an integer from 2 to 10;
each R$^3$ is independently selected from hydrogen and methyl; and
each X is independently selected from —O—, —S—, —NH—, and —N(—CH$_3$)—;
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are as defined as for R$^1$;
m is an integer from 0 to 50;
n is an integer from 1 to 60; and
p is an integer from 2 to 6.

In certain embodiments, a Michael acceptor-terminated urethane-containing prepolymer is derived from the reaction of a thiol-terminated sulfur-containing prepolymer, a hydroxy vinyl ether, a diisocyanate, and 1,3-bis(vinylsulfonyl)-2-propanol (HO—CH(—CH$_2$—S(O)$_2$—CH═CH$_2$)$_2$), and optionally a polyfunctionalizing agent. Thus, in certain embodiments, a Michael acceptor-terminated urethane-containing prepolymer comprises the structure of Formula (15a), of Formula (15b), or a combination thereof.

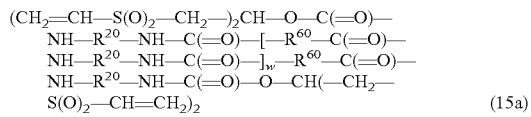

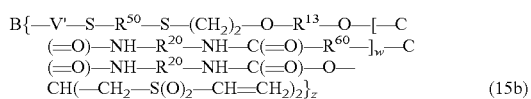

where each R$^{13}$, each R$^{20}$, each R$^{50}$, each R$^{60}$, w, z, B, and each —V'— are as defined herein. In certain embodiments of Formula (15a) and Formula (15b) each R$^{50}$ has the structure of Formula (6).

In certain embodiments of prepolymers of Formula (13a) and Formula (13b), each R$^{30}$ comprises a terminal maleimide group, and in certain embodiments a terminal bismaleimide group.

In certain embodiments, Michael acceptor-terminated urethane-containing prepolymers comprise the reaction product of reactants comprising an isocyanate-terminated urethane-containing adduct, and a compound comprising a group reactive with an isocyanate and at least one Michael acceptor group. In certain embodiments, Michael acceptor-terminated urethane-containing prepolymers comprise the reaction product of reactants comprising an isocyanate-terminated urethane-containing adduct, and a compound comprising a group reactive with an isocyanate; at least one Michael acceptor group; and at least one metal ligand.

In certain embodiments, a Michael acceptor-terminated urethane-containing prepolymer may be prepared by reacting an isocyanate-terminated urethane-containing adduct with a compound having at least one Michael acceptor group, and optionally a metal ligand group, and a group reactive with the isocyanate group such as a hydroxy group. The reaction can take place at a suitable temperature such as from 50° C. to 100° C., for a suitable time such as from 0.5 hours to 5 hours, in the presence of a suitable catalyst such as dibutyltin-dilaurate.

In certain embodiments, an isocyanate-terminated urethane-containing adduct comprises an isocyanate-terminated urethane-containing polythioether adduct, an isocyanate-terminated urethane-containing polysulfide adduct, or a combination of any of the foregoing.

In certain embodiments, Michael acceptor-terminated urethane-containing prepolymers provided by the present disclosure can be capped with a moiety having a group reactive with an isocyanate and at least one Michael acceptor group. In certain embodiments, the capping moiety further includes a metal ligand.

Groups reactive with isocyanate groups include hydroxy groups, amine groups, and thiol groups.

Michael acceptor groups are well known in the art. In certain embodiments, a Michael acceptor group comprises an activated alkene, such as an alkenyl group proximate to an electron-withdrawing group such as an enone, nitro, halo, nitrile, carbonyl, or nitro group. In certain embodiments, a Michael acceptor group is selected from a vinyl ketone, a vinyl sulfone, a quinone, an enamine, a ketimine, an aldimine, and an oxazolidine. In certain embodiments, each of the Michael acceptor groups may be the same and in certain embodiments, at least some of the Michael acceptor groups are different.

In certain embodiments, a Michael acceptor group is a vinyl sulfone such as a divinyl sulfone.

In certain embodiments, each arm of a Michael acceptor-terminated urethane-containing prepolymer may be capped with from 1 to 4 Michael acceptor groups. In certain embodiments, each arm of a Michael acceptor-terminated urethane-containing prepolymer comprises one terminal Michael acceptor group. In certain embodiments, each arm of a Michael acceptor-terminated urethane-containing prepolymer is comprises two terminal Michael acceptor groups.

In certain embodiments of Formula (13a) and Formula (13b), each R$^{30}$ is derived from a bis(vinylsulfonyl)alkanol and has the structure of Formula (16):

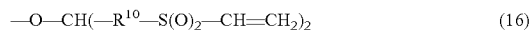

wherein each R$^{10}$ is C$_{2-4}$ alkanediyl.

In certain embodiments, a compound comprising a group reactive with an isocyanate and at least one Michael acceptor group comprises a bis(vinylsulfonyl)alkanol.

In certain embodiments, a compound comprises a hydroxy group and at least one Michael acceptor group.

In certain embodiments, Michael acceptor-terminated urethane-containing prepolymers provided by the present disclosure are capped with a compound having a group reactive with an isocyanate, at least one Michael acceptor group, and at least one metal ligand.

In certain embodiments, a metal ligand is capable of coordinating to an aerospace surface.

In certain embodiments, a compound comprises a hydroxy group and two vinyl sulfonyl groups.

Particularly convenient compounds that include two Michael acceptor groups, a metal ligand, and a hydroxy group are bis(vinylsulfonyl)alkanols. The terminal vinylsulfonyl groups are Michael acceptors, the bis(sulfonyl) groups serve as a metal ligand, and the hydroxy group can be reacted with the isocyanate groups of the isocyanate-terminated urethane-containing adduct.

In certain embodiments, a compound comprising a group reactive with an isocyanate, at least one Michael acceptor group, and at least one metal ligand, comprises a bis(vinylsulfonyl)alkanol, and in certain embodiments, 1,3-bis(vinylsulfonyl)-2-propanol.

In certain embodiments, Michael acceptor-terminated urethane-containing prepolymers are terminated in a moiety comprising at least one Michael acceptor group and optionally at least one metal ligand and are bonded to isocyanate groups of the prepolymer via a urethane linkage.

Thus, in certain embodiments, a Michael acceptor/metal ligand containing compound comprises a reactive hydroxy group capable of reacting with terminal isocyanate groups of the isocyanate-terminated urethane-containing adduct precursor.

Previous work by the inventors demonstrated that the incorporation of metal ligands into the backbone of a sulfur-containing prepolymer and/or terminating a sulfur-containing prepolymer with a metal ligand can improve the adhesion of coatings and sealants to metal surfaces formed using metal ligand-containing prepolymers.

Bis(sulfonyl)alkanols represent one type of metal ligand that may be incorporated into the backbone of a polymer or form a terminal group such as a sulfur-containing prepolymer to improve surface adhesion. Other metal ligands may also be incorporated into the backbone of a polymer to enhance surface adhesion. In certain embodiments, such as for aerospace sealant applications, the metal ligands may be selected from a ligand capable of coordinating to aluminum, aluminum oxide, Al(III), anodized aluminum, titanium, titanium oxide, and/or Alodine® surfaces. The metal ligand may form a bidentate, tridentate, or higher order coordination complex to surface atoms.

Metal ligands and in particular aluminum (III) metal ligands include hard Lewis bases such as —OH, —PO$_4$, —SO$_4$, —COOH, —C=O, and —NH$_2$ groups, which are capable of donating electrons to vacant orbitals of the metal. Basic donor groups effective in forming multidentate coordination complexes with aluminum (III) include aliphatic monohydroxy acid anions, catecholates, aromatic hydroxy acid anions, 3-hydroxy-4-pyridinones, hydroxamates, and 3-hydroxy-2-pyridinones. Stable aluminum (III) complexes are with multidentate ligands having negative oxygen electron donors. A metal ligand may form a multidentate complex such as a bidentate complex or a tridentate complex with the metal.

In certain embodiments, a metal ligand functional group is derived from a metal chelating agent selected from a bis(sulfonyl)alkanol, a hydroxypyridinone, and an acetylacetonate.

Examples of aluminum, aluminum oxide and Al(III) chelating agents include 2,3-dihydroxybenzoic acid, 5-nitrosalicylate, 3-hydroxy-4-pyridinone, 3-hydroxy-2-pyridinone, 2-2'-dihyrdroxyazobenzene, 8-hydroxyquinoline, oxylate, malonate, citrate, inimodiacetic acid, picolinic acid, maltol, kojic acid, N,N'-diacetic acid (EDTA), N-(2-hydroxy)ethylenediamenetriacetic acid (HEDTA), ethylenediamine-N,N'-bis(2-hydroxyphenylacetic acid (EDDHA), and N,N'-bis(hydroxybenzyl)ethylenediamine-N,N'-diacetic acid (HBED), acetoacetate, acetylacetonate, a catecholate, a hydroxamate, and a quinone. Other aluminum and aluminum oxide chelators are disclosed, for example, in Yokel, *Coordination Chemistry Reviews* 2002, 228, 97-113; and in Martell et al., *Coordination Chemistry Reviews* 1996, 149, 311-328.

Examples of titanium or titanium oxide metal ligands include H$_2$O$_2$, acetoacetonate (CH$_2$(COCH$_3$)$_2$), EDTA, trans-1,2-cyclohexanediamne tetraacetic acid, glycoletherdiamine tetracetic acid (GEDTA, (CH$_2$OCH$_2$CH$_2$N(CH$_2$COOH)$_2$)$_2$), diethylenetriamine pentaacetic acid (DTPA, HOOCH$_2$N(CH$_2$CH$_2$N(CH$_2$COOH)$_2$)$_2$), nitrile triacetic acid (NTA, N(CH$_2$COOH)$_3$), salicylic acid, lactic acid, acetoacetonate, triethanolamine, and combinations of any of the foregoing.

In certain embodiments, a metal ligand comprises at least two heteroatomic groups capable of coordinating to aluminum (III) surfaces. In certain embodiments, a metal ligand comprises at least two heteroatomic groups selected from —OH, —PO$_4$, —P(O)$_2$—, —SO$_4$, —S(O)$_2$—, —COOH, —C=O, —NH$_2$, —NH—, and a combination of any of the foregoing.

In certain embodiments, a metal ligand functional group comprises a moiety selected from Formula (17a), Formula (17b), Formula (17c), Formula (17d), Formula (17e), and a combination of any of the foregoing:

—X—(CH$_2$)$_s$—CH(—OH)—    (17a)

—X—(CH$_2$)$_s$—CH(—OH)—(CH$_2$)$_n$—X—    (17b)

—CH(—OH)—(CH$_2$)$_s$—X—(CH$_2$)$_s$—CH(—OH)—    (17c)

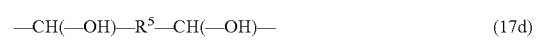

—CH(—OH)—R$^5$—CH(—OH)—    (17d)

—C(O)—R$^5$—C(O)—    (17e)

wherein —X— is independently selected from —C(O)— or —S(O)$_2$—; each s is independently selected from 1, 2, and 3; and R$^5$ is a C$_{1-3}$ alkane-diyl. In certain embodiments, each X is —C(O)— and each s is 1; and in certain embodiments, each X is —S(O)$_2$— and each s is 1.

In certain embodiments, a metal ligand comprises a bis(sulfonyl)alkanol, a hydroxypyridinone, a quinone, an acetylacetonate, or a combination of any of the foregoing.

In certain embodiments, an isocyanate-terminated urethane-containing adduct comprises an isocyanate-terminated urethane-containing polythioether adduct, an isocyanate-terminated urethane-containing polysulfide adduct, or a combination thereof.

In certain embodiments, an isocyanate-terminated urethane-containing adduct comprises an isocyanate-terminated urethane-containing adduct of Formula (18a), an isocyanate-terminated urethane-containing adduct of Formula (18b), or a combination thereof:

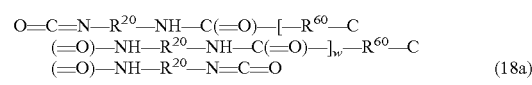

O=C=N—R$^{20}$—NH—C(=O)—[—R$^{60}$—C(=O)—NH—R$^{20}$—NH—C(=O)—]$_w$—R$^{60}$—C(=O)—NH—R$^{20}$—N=C=O    (18a)

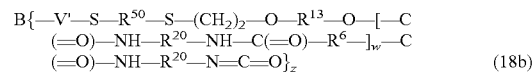

B{—V'—S—R$^{50}$—S—(CH$_2$)$_2$—O—R$^{13}$—O—[—C(=O)—NH—R$^{20}$—NH—C(=O)—R$^6$—]$_w$—C(=O)—NH—R$^{20}$—N=C=O}$_z$    (18b)

wherein, w is an integer from 1 to 100;

each R$^{13}$ independently comprises C$_{2-10}$ alkanediyl;

each R$^{20}$ independently comprises a core of a diisocyanate;

each R$^{30}$ independently comprises at least one terminal Michael acceptor group;

each R$^{50}$ independently comprises a core of a sulfur-containing prepolymer;

each $R^{60}$ independently comprises a moiety having the structure of Formula (14):

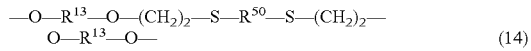
$$-O-R^{13}-O-(CH_2)_2-S-R^{50}-S-(CH_2)_2- \\ O-R^{13}-O- \qquad (14)$$

B represents a core of a z-valent, polyfunctionalizing agent B(—V)$_z$ wherein, z is an integer from 3 to 6; and each V is a moiety comprising a terminal group reactive with a thiol group; and each —V'— is derived from the reaction of —V with a thiol.

In certain embodiments of Formula (18a) and (18b), each $R^{50}$ is derived from a polythioether. For example, in certain embodiments, each $R^{50}$ has the structure of Formula (6):

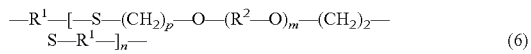
$$-R^1-[-S-(CH_2)_p-O-(R^2-O)_m-(CH_2)_2- \\ S-R^1-]_n- \qquad (6)$$

wherein, each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_s$—X—]$_q$—(—CHR$^3$—)$_r$—, wherein, s is an integer from 2 to 6;

q is an integer from 1 to 5;

r is an integer from 2 to 10;

each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined as for $R^1$;

m is an integer from 0 to 50;

n is an integer from 1 to 60; and p is an integer from 2 to 6.

In certain embodiments of Formula (18a) and (18b), w is an integer from 2-50, and in certain embodiments from 2-20.

In certain embodiments, an isocyanate-terminated urethane-containing adduct comprises the reaction product of reactants comprising a hydroxy-terminated sulfur-containing adduct and a diisocyanate.

In certain embodiments, a hydroxy-terminated sulfur-containing adduct and a diisocyanate are reacted in a molar ratio such that the isocyanate-terminated urethane-containing adduct comprises alternating units of a sulfur-containing moiety and a diisocyanate. In certain embodiments, an isocyanate-terminated urethane-containing adduct comprises the reaction product of reactants comprising hydroxy-terminated Permapol® 3.1E and a diisocyanate such as a cycloaliphatic diisocyanate.

Isocyanate-terminated urethane-containing adducts may be synthesized by reacting, for example, a diisocyanate with an appropriately terminated sulfur-containing adduct such as, for example, a hydroxy-terminated sulfur-containing adduct, at a suitable temperature such as from 50° C. to 100° C. for a suitable time such as from 1 hour to 4 hours, in the presence of a free radical catalyst, such as 2,2'-azobis(2-methylbutyronitrile). Those skilled in the art can determine appropriate reaction conditions.

In certain embodiments, sulfur-containing adducts provided by the present disclosure comprise terminal hydroxy groups that are reactive with isocyanate groups and may be reacted directly with a polyisocyanate such as a diisocyanate to provide isocyanate-terminated urethane-containing adducts useful in forming Michael acceptor-terminated urethane-containing prepolymers provided by the present disclosure.

In certain embodiments, a sulfur-containing adduct may be functionalized to provide groups sufficiently reactive with isocyanate groups. For example, in certain embodiments, thiol-terminated sulfur-containing adducts provide suitable precursors to form Michael acceptor-terminated urethane-containing prepolymers of the present disclosure. In certain embodiments, a thiol-terminated sulfur-containing adduct can be reacted with a compound having a group reactive with an alkenyl group and a hydroxy group. Examples of such compounds include hydroxy vinyl ethers.

In certain embodiments, a hydroxy-terminated sulfur-containing adduct comprises a hydroxy-terminated polythioether adduct, such as a hydroxy-terminated polythioether adduct of Formula (19a), a hydroxy-terminated polythioether adduct of Formula (19b), or a combination thereof.

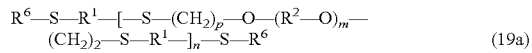
$$R^6-S-R^1-[-S-(CH_2)_p-O-(R^2-O)_m- \\ (CH_2)_2-S-R^1-]_n-S-R^6 \qquad (19a)$$

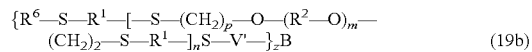
$$\{R^6-S-R^1-[-S-(CH_2)_p-O-(R^2-O)_m- \\ (CH_2)_2-S-R^1-]_nS-V'-\}_zB \qquad (19b)$$

where $R^1$, $R^2$, m, n, and p are defined herein, and each $R^6$ is a moiety comprising a terminal hydroxy group.

In certain embodiments, each $R^6$ is derived from a hydroxy vinyl ether and has the structure of Formula (20):

$$-CH_2-CH_2-O-R^{13}-OH \qquad (20)$$

where $R^{13}$ is $C_{2-10}$ alkanediyl. In certain embodiments, $R^{13}$ is —(CH$_2$)$_4$—.

Isocyanate-terminated urethane-containing adducts can be prepared by reacting a polyisocyanate with a sulfur-containing adduct comprising terminal groups reactive with isocyanate groups such as terminal hydroxy groups. A polyisocyanate can be difunctional, n-functional where n is an integer from 3 to 6, or a combination of any of the foregoing. In certain embodiments, a polyisocyanate is difunctional and is referred to as a diisocyanate. A diisocyanate may be aliphatic, alicyclic or aromatic.

Examples of suitable aliphatic diisocyanates include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate) (H$_{12}$MDI). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl)methyl]-3-isocyanato-2-methyl benzene, and 2,4,6-triisopropyl-m-phenylene diisocyanate.

Examples of suitable alicyclic diisocyanates from which the diisocyanates may be selected include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Examples of suitable aromatic diisocyanates in which the isocyanate groups are not bonded directly to the aromatic ring include, but are not limited to, bis(isocyanatoethyl)benzene, a, a, α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl) diphenyl ether, bis(isocyanatoethyl)phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis (isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Other examples of suitable diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, 4,4-methylene dicyclohexyl diisocyanate ($H_{12}MDI$), and a combination of any of the foregoing.

Additional examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Isocyanate-terminated urethane-containing adducts may be prepared, for example, by reacting a hydroxy-terminated sulfur-containing adduct, such as the hydroxy-terminated polythioethers of Formula (12a) and Formula (12b) with a compound having a terminal isocyanate group and a group that is reactive with the terminal hydroxy groups of the polythioethers of Formula (19a) and Formula (19b), such as a diisocyanate.

In certain embodiments, isocyanate-terminated urethane-containing polythioether adducts may be prepared, for example, by reacting a hydroxy-terminated polythioether adduct of Formula (19a) or Formula (19b) with a diisocyanate such as TDI, Isonate™ 143L (polycarbodiimide-modified diphenylmethene diisocyanate), Desmodur® N3400 (1,3-diazetidine-2,4-dione, 1,3-bis(6-isocyanatohexyl)-), IDPI (isophorone diisocyanate), or Desmodur® W (H12MDI) optionally in the presence of a catalyst such as dibutyltin dilaurate in an organic solvent such as benzoyl chloride at a temperature from about 70° C. to about 80° C. to provide the corresponding isocyanate-terminated urethane-containing polythioether adduct of Formula (13a), (13b), (15a), and (15b).

In certain embodiments, the moiety —C(=O)—NH—$R^{20}$—NH—C(=O)— can be derived from a diisocyanate of Formula (21):

$$O=C=N-R^{20}-N=C=O \qquad (21)$$

In certain embodiments, a hydroxy-terminated sulfur-containing adduct comprises a reaction product of reactants comprising a thiol-terminated sulfur-containing adduct and a hydroxy vinyl ether.

In certain embodiments, a thiol-terminated sulfur-containing prepolymer comprises a thiol-terminated polythioether prepolymer, a thiol-terminated polysulfide prepolymer, or a combination thereof.

Suitable thiol-terminated sulfur-containing prepolymers for use in preparing Michael acceptor-terminated urethane-containing prepolymers include any of those disclosed herein such as the thiol-terminated sulfur-containing polymers of Formula (6), Formula (7a), and Formula (7b).

In certain embodiments, a hydroxy-terminated sulfur-containing adduct may be formed by reacting a thiol-terminated sulfur-containing adduct with a hydroxy vinyl ether.

In certain embodiments, hydroxy vinyl ethers can be used to functionalize a thiol-terminated sulfur-containing adduct with a group reactive with an isocyanate group. In certain embodiments, a hydroxy-functional vinyl ether has the structure of Formula (22):

$$CH_2=CH-O-(CH_2)_t-OH \qquad (22)$$

where t is an integer from 2 to 10.

Examples of suitable hydroxy-functional vinyl ethers useful for reacting with thiol-terminated sulfur-containing prepolymers include 1,4-cyclohexane dimethylol monovinyl ether, 1-methyl-3-hydroxypropyl vinyl ether, 4-hydroxybutyl vinyl ether, and a combination of any of the foregoing. In certain embodiments, a hydroxy-functional vinyl ether is 4-hydroxybutyl vinyl ether.

In certain embodiments, Michael acceptor-terminated urethane-containing prepolymers can be prepared in a three-step reaction. The reaction sequence involves providing an isocyanate-terminated urethane-containing adduct followed by capping the terminal isocyanate groups with a polyfunctional Michael acceptor. One skilled in the art will appreciate that other chemistries can be employed to synthesize the disclosed Michael acceptor-terminated urethane-containing prepolymers. For example, rather than using a thiol-terminated sulfur-containing prepolymer, an alkenyl-terminated sulfur-containing prepolymer may be used and linked to a polyisocyanate via a diamine. Thus, synthetic methods, precursors and intermediates as appropriate provided that the Michael acceptor-terminated urethane-containing prepolymer comprises a urethane- and sulfur-containing backbone having urethane groups capped with a polyfunctional Michael acceptor.

In a first step, a thiol-terminated sulfur-containing adduct can be reacted with a hydroxy vinyl ether to provide a hydroxy-terminated sulfur-containing adduct. The reaction can be performed at elevated temperature in the presence of a free-radical initiator.

In a second step, the hydroxy-terminated sulfur-containing adduct can be reacted with a polyisocyanate such as a diisocyanate to provide an isocyanate-terminated urethane-containing adduct. The reaction can be performed at elevated temperature in the presence of a tin catalyst.

In a third step, the isocyanate-terminated urethane-containing adduct can be reacted with a polyfunctional Michael acceptor to provide a polyfunctional Michael acceptor-terminated urethane-containing prepolymer of the present disclosure. The reaction can be performed at elevated temperature in the presence of a tin catalyst.

An example of a suitable reaction sequence is provided as follows:

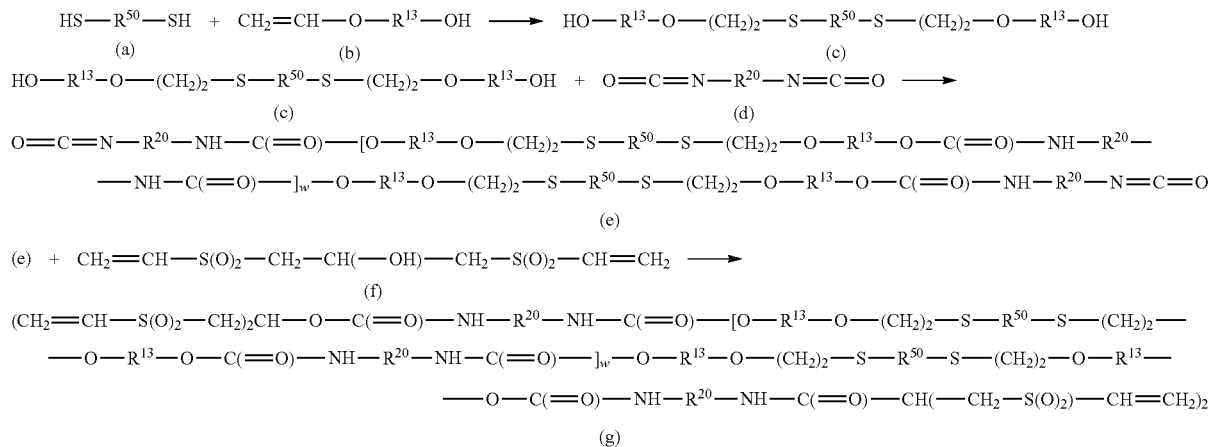

where $R^{13}$, $R^{20}$, $R^{30}$, $R^{50}$, and $R^{60}$ are defined herein. An example of a reaction sequence is shown in FIG. 1. The reaction sequence illustrated above and in FIG. 1 begins with the reaction of a dithiol. In certain embodiments, the reaction can begin with a polythiol such as a trithiol, or with a mixture of polythiols such as a combination of dithiols and trithiols.

Compositions provided by the present disclosure comprise one or more phosphine catalysts such as tertiary phosphine catalysts.

In certain embodiments, a phosphine catalyst has the structure of Formula (23):

where $R^1$, $R^2$ and $R^3$ are each independently selected from $C_{1-12}$ alkyl, substituted $C_{1-12}$ alkyl, $C_{6-12}$ aryl, substituted $C_{6-12}$ aryl, $C_{3-12}$ cycloalkyl, substituted $C_{3-12}$ cycloalkyl, $C_{6-12}$ arylalkyl, and substituted $C_{6-12}$ arylalkyl. In certain embodiments, $R^1$, $R^2$, and $R^3$ are independently selected from $C_{1-6}$ alkyl and hydroxyl-substituted $C_{1-6}$ alkyl. In certain embodiments, $R^1$, $R^2$, and $R^3$ are independently selected from $C_{1-6}$ alkyl, and in certain embodiments n-hydroxyl substituted $C_{1-6}$ alkyl.

In certain embodiments, a phosphine catalyst comprises a tri-substituted phosphine having at least one substituent that is an alkyl group. The other substituents on the phosphine may be any combination of aryl, cycloalkyl, and/or alkyl groups. For example, two substituents on the phosphine may be alkyl groups having four or more carbon atoms, often six or more carbon atoms, and one substituent may be an aryl group. Alternatively, all three substituents may be alkyl groups, such as alkyl groups having six or more carbon atoms. Suitable examples of phosphine catalysts include tributylphosphine, triisobutylphosphine, tri-tertiary-butylphosphine, trioctyl phosphine, tris(2,4,4-trimethylpentyl)phosphine, tricyclopentylphosphine, tricyclohexylphosphine, tri-n-octylphosphine, tri-n-dodecylphosphine, triphenyl phosphine, and dimethyl phenyl phosphine.

In certain embodiments, a suitable phosphine catalyst includes a hydroxyl-substituted $C_{1-6}$ alkyl phosphine catalyst where each of $R^1$, $R^2$, and $R^3$ has the structure HO—$(CH_2)_n$— where n is an integer from 1 to 6. In certain embodiments, a phosphine catalyst is selected from tris(2-hydroxyethyl)phosphine, tris(3-hydroxypropyl)phosphine, tris(4-hydroxybutyl)phosphine, tris(5-hydroxypentyl)phosphine, and tris(6-hydroxyhexyl)phosphine.

Phosphine catalysts are commercially available or may be prepared according to standard synthetic methods such as a Grignard reaction alkylhalogenides with phosphorous trichloride or catalytic addition of alkenes to phosphine.

A phosphine catalyst may be used in an amount sufficient to enable or accelerate reaction of any reactive functional groups in the reaction mixture. The amount may vary based on the chemistry of the reactants involved, but typically the amount of tri-substituted phosphine used in the method of the present invention is 0.1 to 10 percent by weight, based on the total weight of resin solids in the reaction mixture.

Compositions provided by the present disclosure may further comprise one or more Michael acceptor compounds and/or one or more polythiols.

When a composition comprises a polyfunctional monomeric Michael acceptor, any suitable monomeric Michael acceptor having at least two Michael acceptor groups such as, for example, divinyl sulfone or other Michael acceptors including any of those disclosed herein may be used.

A polyfunctional Michael acceptor compound has at least two Michael acceptor groups. A polyfunctional Michael acceptor may have an average Michael acceptor functionality from 2 to 6, from 2 to 4, from 2 to 3, and in certain embodiments, from 2.05 to 2.5. In certain embodiments, a polyfunctional Michael acceptor is difunctional, such as, divinyl ketone and divinyl sulfone. A Michael acceptor compound having a functionality greater than two may be prepared by reacting a compound having a Michael acceptor group and a group reactive with terminal groups of a polyfunctionalizing agent such as those disclosed herein, using appropriate reaction conditions.

In certain embodiments where a Michael acceptor compound is used, the molecular weight of the Michael acceptor is less than 600 Daltons, less than 400 Daltons, and in certain embodiments, less than 200 Daltons.

In certain embodiments, a Michael acceptor compound comprises from about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt %, where wt % is based on the total dry solids weight of the composition.

A polythiol may be a small molecule such as compound having a molecular weight less than 400 Daltons, a prepolymer, or a combination thereof. For example, a polythiol may be a dithiol of Formula (16) such as, for example, DMDO, a polythiol of Formula (18), or a combination of any of the foregoing.

Compositions provided by the present disclosure may comprise one or more additional components suitable for use in aerospace sealants and the selection and amounts depend at least in part on the desired performance characteristics of the cured sealant under conditions of use.

In certain embodiments, compositions provided by the present disclosure comprise one or more than one adhesion promoters. A one or more adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about m and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]—[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Fillers also include high band gap materials such as zinc sulfide and inorganic barium compounds. In certain embodiments, an electrically conductive base composition can comprise an amount of electrically non-conductive filler ranging from 2 wt % to 10 wt % based on the total weight of the base composition, and in certain embodiments, can range from 3 wt % to 7 wt %. In certain embodiments, a curing agent composition can comprise an amount of electrically non-conductive filler ranging from less than 6 wt % and in certain embodiments ranging from 0.5% to 4% by weight, based on the total weight of the curing agent composition.

Low density fillers can reduce the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

In certain embodiments, compositions provided by the present disclosure comprise an electrically conductive filler. Electrical conductivity and EMI/RFI shielding effectiveness can be imparted to composition by incorporating conductive materials within the polymer. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Fillers used to impart electrical conductivity and EMI/RFI shielding effectiveness to polymer compositions are well known in the art. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of electrically conductive fillers used in the compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. In certain embodiments, the amount of Ni-coated graphite in a base composition can range from 40 wt % to 80 wt %, and in certain embodiments can range from 50 wt % to 70 wt %, based on the total weight of the base composition. In certain embodiments, an electrically conductive filler can comprise Ni fiber. Ni fiber can have a diameter ranging from 10 m to 50 m and have a length ranging from 250 m to 750 m. A base composition can comprise, for example, an amount of Ni fiber ranging from 2 wt % to 10 wt %, and in certain embodiments, from 4 wt % to 8 wt %, based on the total weight of the base composition.

Carbon fibers, particularly graphitized carbon fibers, can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 m to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 m diameter round fiber having an electrical resistivity of 0.00055 Ω-cm.

The average particle size of an electrically conductive filler can be within a range useful for imparting electrical conductivity to a polymer-based composition. For example, in certain embodiments, the particle size of the one or more fillers can range from 0.25 m to 250 m, in certain embodiments can range from 0.25 m to 75 m, and in certain embodiments can range from 0.25 m to 60 m. In certain embodiments, composition of the present disclosure can comprise Ketjen Black EC-600 JD (Akzo Nobel, Inc., Chicago, Ill.), an electrically conductive carbon black characterized by an iodine absorption of 1000-11500 mg/g (J0/84-5 test method), and a pore volume of 480-510 $cm^3$/100 gm (DBP absorption, KTM 81-3504). In certain embodiments, an electrically conductive carbon black filler is Black Pearls 2000 (Cabot Corporation, Boston, Mass.).

In certain embodiments, electrically conductive polymers can be used to impart or modify the electrical conductivity of compositions of the present disclosure. Polymers having sulfur atoms incorporated into aromatic groups or adjacent to double bonds, such as in polyphenylene sulfide, and polythiophene, are known to be electrically conductive. Other electrically conductive polymers include, for example, polypyrroles, polyaniline, poly(p-phenylene) vinylene, and polyacetylene. In certain embodiments, the sulfur-containing polymers forming a base composition can be polysulfides and/or polythioethers. As such, the sulfur-containing polymers can comprise aromatic sulfur groups and sulfur atoms adjacent to conjugated double bonds such as vinylcyclohexene-dimercaptodioxaoctane groups, to enhance the electrical conductivity of the compositions of the present disclosure.

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50$Ω$·/$cm^2$, and in certain embodiments, a sheet resistance less than 0.15 $Ω$/$cm^2$. The amount and type of filler can also be selected to provide effective EMI/RFI shielding over a frequency range of from 1 MHz to 18 GHz for an aperture sealed using a sealant composition of the present disclosure.

Galvanic corrosion of dissimilar metal surfaces and the conductive compositions of the present disclosure can be minimized or prevented by adding corrosion inhibitors to the composition, and/or by selecting appropriate conductive fillers. In certain embodiments, corrosion inhibitors include strontium chromate, calcium chromate, magnesium chromate, and combinations thereof. U.S. Pat. No. 5,284,888 and U.S. Pat. No. 5,270,364 disclose the use of aromatic triazoles to inhibit corrosion of aluminum and steel surfaces. In certain embodiments, a sacrificial oxygen scavenger such as Zn can be used as a corrosion inhibitor. In certain embodiments, the corrosion inhibitor can comprise less than 10% by weight of the total weight of the electrically conductive composition. In certain embodiments, the corrosion inhibitor can comprise an amount ranging from 2% by weight to 8% by weight of the total weight of the electrically conductive composition. Corrosion between dissimilar metal surfaces can also be minimized or prevented by the selection of the type, amount, and properties of the conductive fillers comprising the composition.

In certain embodiments, Michael acceptor-terminated sulfur-containing prepolymers and thiol-terminated prepolymers comprise from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

Compositions provided by the present disclosure may be used, for example, in sealants, coatings, encapsulants, and potting compositions. A sealant includes a composition capable of producing a film or a coating that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions, such as sealants, may be provided as multi-pack compositions, such as two-pack compositions, wherein one package comprises one or more components comprising at least two terminal groups reactive with Michael acceptor groups and a second package comprises one or more Michael acceptors. Additives and/or other materials may be added to either or both packages as desired or necessary. The two packages may be combined and mixed prior to use. In certain embodiments, the pot life of the combined composition is at least 12 hours, at least 24 hours, at least 48 hours, and in certain embodiments, more than 48 hours.

In two-part compositions, one or more controlled-release phosphine catalysts may be included in either component or in both components. In certain embodiments, the controlled-release phosphine catalyst may be a third component that is mixed with a thiol-terminated sulfur-containing prepolymer and Michael acceptor-terminated sulfur-containing prepolymer prior to use. In certain embodiments, the compositions may be provided as a one-part composition. Such one-part compositions are maintained and stored under conditions such that the controlled release catalyst is not substantially released. For example, a composition comprising a from UV radiation, a moisture release catalyst may be sealed from moisture and frozen, and a matrix encapsulant may be stored at temperatures below the melting temperature of the matrix encapsulant polymer.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises (a) applying a sealant composition provided by the present disclosure to one or more surfaces defining an aperture, (b) assembling the surfaces defining the aperture, and (c) curing the sealant, to provide a sealed aperture.

In certain embodiments, methods of using a composition provided by the present disclosure comprise applying a composition to a substrate; and allowing the composition to cure to provide a cured sealant. In certain embodiments, methods of using a composition provided by the present disclosure comprise applying a composition to a substrate, wherein the phosphine catalyst comprises a controlled-release encapsulated phosphine catalyst; activating the phosphine catalyst; and allowing the composition to cure to provide a cured sealant.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

In certain embodiments, a composition achieves a tack-free cure in less than about 1 hours, in less than about 2 hours, less than about 4 hours, less than about 6 hours, and in certain embodiments, less than about 412 hours, after the useful working time of the composition.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following application to a surface. In general, full adhesion strength as well as other properties of cured compositions of the present disclosure becomes fully developed within 7 days following mixing and application of a curable composition to a surface.

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a cure time within 24 hours of the pot life. Useful working time or pot life refers to the time period the composition remains workable for application at ambient temperatures after the catalyst is released. In certain embodiments, compositions provided by the present disclosure, following release of the catalytic phosphine, have a pot life of at least 6 hours, at least hours, at least 18 hours, at least 24 hours, and in certain embodiments, more than 24 hours. In certain embodiments, compositions provided by the present disclosure cure in less than 6 hours after the pot life, in less than 12 hours, in less than 18 hours, in less than 24 hours, in less than 48 hours, and in certain embodiments, in less than 72 hours after useful working time.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that, when cured, compositions of the present disclosure used in aviation and aircraft applications exhibit a percent volume swell not greater than 25% following immersion for one week at 60° C. (140° F.) and ambient pressure in JRF type 1. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

In certain embodiments, an electrically conductive sealant composition provided by the present disclosure exhibits the following properties measured at room temperature following exposure at 500° F. for 24 hours: a surface resistivity of less than 1 ohms/square, a tensile strength greater than 200 psi, an elongation greater than 100%, and a cohesive failure of 100% measured according to MIL-C-27725.

In certain embodiments, a cured sealant provided by the present disclosure exhibits the following properties when cured for 2 days at room temperature, 1 day at 140° F., and 1 day at 200° F.: a dry hardness of 49, a tensile strength of 428 psi, and an elongation of 266%; and after 7 days in JRF, a hardness of 36, a tensile strength of 312 psi, and an elongation of 247%.

In certain embodiments, compositions provided by the present disclosure exhibit a Shore A hardness (7-day cure) greater than 10, greater than 20, greater than 30, and in certain embodiments, greater than 40; a tensile strength greater than 10 psi, greater than 100 psi, greater than 200 psi, and in certain embodiments, greater than 500 psi; an elongation greater than 100%, greater than 200%, greater than 500%, and in certain embodiments, greater than 1,000%; and a swell following exposure to JRF (7 days) less than 20%.

EXAMPLES

Embodiments provided by the present disclosure are further illustrated by reference to the following examples, which describe the synthesis, properties, and uses of certain Michael acceptor-terminated sulfur-containing prepolymers, thiol-terminated prepolymers, and phosphine catalysts. It will be apparent to those skilled in the art that many modifications, both to materials, and methods, may be practiced without departing from the scope of the disclosure.

Example 1

Synthesis of Thiol-Terminated Polythioether Prepolymer

Triallylcyanurate (6.0 lbs) and dimercaptodioxaoctane (DMDO) (169 lbs) were charged in a 50-gallon reactor. The reactor was equipped with an agitator, gas-passing adapter and thermometer. Agitation was started. The reactor was flushed with dry nitrogen. The reaction mixture was heated to 76° C. A solution of radical initiator Vazo®-67 in diethylene glycol divinyl ether (126 lbs) was introduced into the reaction mixture over a period of 2 hours while a temperature of 66-76° C. was maintained. Following addition of the divinyl ether, the temperature of the reaction mixture was increased to 84° C. The reaction mixture was cooled to 74° C. and nine portions of Vazo®-67 (total of 0.2 lbs) were added at an interval of 1 hour while the temperature was maintained at 74-77° C. The reaction mixture was then heated at 100° C. for 2 hours, cooled to 80° C., and evacuated at 68-80° C./5-7 mmHg for 1.75 hours to provide a thiol-terminated prepolymer.

Example 2

Synthesis of Vinyl Sulfone-Terminated Prepolymer

The thiol-terminated prepolymer of Example 1 (3332.4 g), divinyl sulfone (260.53 g), toluene (417.08 g) and Polycat® 8 (1.80 g, available from Air Products and Chemicals) were charged into a five-liter flask equipped with a mechanical agitator and a thermal couple. The mixture was mixed for 5 hours. The mixture was then heated to 95° C. under vacuum to remove toluene and Polycat® 8 to provide a vinyl sulfonyl-terminated polythioether prepolymer.

Example 3

Sealant Formulation

The vinyl sulfonyl-terminated polythioether prepolymer of Example 2 (8.40 g), T-5314 (13.00 g, a thiol-terminated prepolymer available from PRC-DeSoto International, Inc., Sylmar, Calif.), and Cytop® 208 (0.0642 g, trihydroxypropyl phosphine, available from Cytec) were charged into a 60-gram plastic container. The mixture was mixed in a high-speed mixer for 60 seconds at 2300 rpm. The mixture was kept in the container. After four days, the mixture cured to 15 Shore A hardness.

Comparative Example 4

Sealant Formulation

The prepolymer in Example 2 (8.40 g) and T-5314 (13.00 g, a thiol-terminated prepolymer available from PRC-DeSoto International, Inc., Sylmar, Calif.) were charged into a 60-gram plastic container. The mixture was mixed in a high speed mixer for 60 seconds at 2300 rpm. The mixture was kept in the container. After 10 days, the mixture remained pasty and uncured.

Example 5

Catalyzed Michael Addition Curing

A composition was prepared by combining thiol-terminated polythioethers (222.12 g; Permapol 3.1E, available from PRC-DeSoto International), HB-40 (5.29 g), and Tung oil (2.84 g). 24.2 g of the polythioether composition was combined with 0.04 wt % trioctylphosphine and then mixed with 0.80 g vinyl sulfone. A sample of the material was spread out and allowed to cure at room temperature. The hardness measured during the cure is shown in FIG. 1.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
a Michael acceptor-terminated sulfur-containing prepolymer, wherein the Michael acceptor-terminated sulfur-containing prepolymer comprises a Michael acceptor-terminated polythioether prepolymer of Formula (11a), a Michael acceptor-terminated polythioether prepolymer of Formula (11b), or a combination thereof:

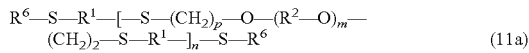
(11a)

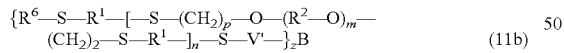
(11b)

wherein:
each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from —O—, —S—, —NH—, and —N(—CH$_3$)—;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;

m is an integer from 0 to 50;
n is an integer from 1 to 60;
p is an integer from 2 to 6;
B represents a core of a z-valent, polyfunctionalizing agent B(—V)$_z$ wherein:
z is an integer from 3 to 6; and
each V is a group comprising a terminal group reactive with a thiol group; and
each —V'— is derived from the reaction of —V with a thiol; and
each $R^6$ independently has the structure of Formula (13a):

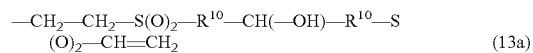
(13a)

wherein each $R^{10}$ is independently selected from $C_{1-3}$ alkanediyl;
a thiol-terminated sulfur-containing prepolymer, wherein the thiol-terminated sulfur-containing prepolymer comprises a thiol-terminated polythioether selected from a thiol-terminated polythioether polymer of Formula (7a), a thiol-terminated polythioether polymer of Formula (7b), or a combination thereof:

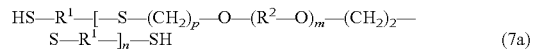
(7a)

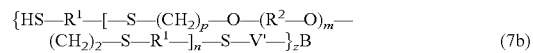
(7b)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from —O—, —S—, —NH—, and —N(—CH$_3$)—;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;
m is an integer from 0 to 50;
n is an integer from 1 to 60;
p is an integer from 2 to 6;
B represents a core of a z-valent, polyfunctionalizing agent B(—V)$_z$ wherein:
z is an integer from 3 to 6; and
each —V is a group comprising a terminal group reactive with thiol groups; and
each —V'— is derived from the reaction of —V with a thiol; and
a phosphine catalyst.

2. The composition of claim 1, wherein the phosphine catalyst comprises a tertiary n-hydroxyl-substituted alkyl phosphine.

3. The composition of claim 1, wherein the phosphine catalyst comprises trihydroxypropyl phosphine.

4. The composition of claim 1, wherein the phosphine catalyst comprises from 0.01 wt % to 0.4 wt % of the composition, wherein wt % is based on the total solids weight of the composition.

5. The composition of claim 1, formulated as a sealant.

6. A cured sealant formed from the composition of claim 5.

7. A method of using the composition of claim 5, comprising:
applying the composition of claim 5 to a substrate; and
allowing the composition to cure to provide a cured sealant.

8. A composition comprising:
a Michael acceptor-terminated sulfur-containing prepolymer;
a thiol-terminated sulfur-containing prepolymer, wherein the thiol-terminated sulfur-containing prepolymer comprises a thiol-terminated polythioether selected from a thiol-terminated polythioether polymer of Formula (7a), a thiol-terminated polythioether polymer of Formula (7b), or a combination thereof:

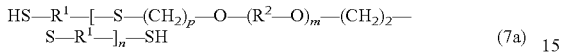
(7a)

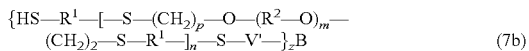
(7b)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from $—O—$, $—S—$, $—NH—$, and $—N(—CH_3)—$;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;
m is an integer from 0 to 50;
n is an integer from 1 to 60;
p is an integer from 2 to 6;
B represents a core of a z-valent, polyfunctionalizing agent $B(—V)_z$ wherein:
z is an integer from 3 to 6; and
each —V is a group comprising a terminal group reactive with thiol groups; and
each —V'— is derived from the reaction of —V with a thiol; and
a phosphine catalyst;
wherein the Michael acceptor-terminated sulfur-containing prepolymer comprises the reaction products of reactants comprising:
(a) a sulfur-containing prepolymer; and
(b) a compound comprising a terminal Michael acceptor group and a group that is reactive with a terminal group of the sulfur-containing prepolymer; and
wherein the compound comprising a terminal Michael acceptor group and a group that is reactive with a terminal group of the sulfur-containing prepolymer comprises a bis(sulfonyl)alkanol, a bismaleimide, or a combination thereof.

9. A composition comprising:
a Michael acceptor-terminated sulfur-containing prepolymer, wherein the Michael acceptor-terminated sulfur-containing prepolymer comprises a Michael acceptor-terminated polythioether prepolymer of Formula (11a), a Michael acceptor-terminated polythioether prepolymer of Formula (11b), or a combination thereof:

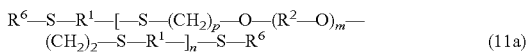
(11a)

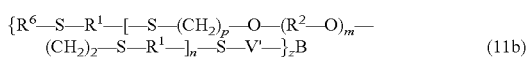
(11b)

wherein:
each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from $—O—$, $—S—$, $—NH—$, and $—N(—CH_3)—$;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;
m is an integer from 0 to 50;
n is an integer from 1 to 60;
p is an integer from 2 to 6;
B represents a core of a z-valent, polyfunctionalizing agent $B(—V)_z$ wherein:
z is an integer from 3 to 6; and
each V is a group comprising a terminal group reactive with a thiol group; and
each —V'— is derived from the reaction of —V with a thiol; and
each $R^6$ has the structure of Formula (13a):

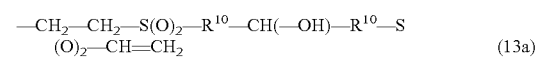
(13a)

wherein each $R^{10}$ is independently selected from $C_{1-3}$ alkanediyl;
a thiol-terminated sulfur-containing prepolymer; and
a phosphine catalyst.

10. The composition of claim 8, wherein the sulfur-containing prepolymer comprises a thiol-terminated polythioether and the terminal group is a thiol group.

11. The composition of claim 5, wherein the sulfur-containing prepolymer comprises a thiol-terminated polythioether selected from a thiol-terminated polythioether polymer of Formula (7a), a thiol-terminated polythioether polymer of Formula (7b), and a combination thereof:

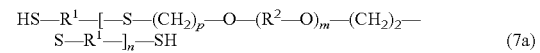
(7a)

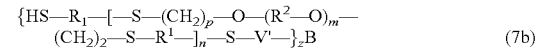
(7b)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from $—O—$, $—S—$, $—NH—$, and $—N(—CH_3)—$;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;
m is an integer from 0 to 50;
n is an integer from 1 to 60;
p is an integer from 2 to 6;

B represents a core of a z-valent, polyfunctionalizing agent B(—V)$_z$ wherein:
z is an integer from 3 to 6; and
each —V is a group comprising a terminal group reactive with thiol groups; and
each —V'— is derived from the reaction of —V with a thiol.

12. The composition of claim 8, wherein the compound comprising a terminal Michael acceptor group and a group that is reactive with a terminal group of the sulfur-containing prepolymer comprises 1,3-bis(vinylsulfonyl)-2-propanol, 1,1'-(methylenedi-4,1-phenylene)bismaleimide, or a combination thereof.

13. The composition of claim 8, wherein the Michael acceptor-terminated sulfur-containing prepolymer comprises a Michael acceptor-terminated urethane-containing prepolymer.

14. The composition of claim 8, wherein the Michael acceptor-terminated sulfur-containing prepolymer comprises a Michael acceptor-terminated urethane-containing prepolymer of Formula (13a), a Michael acceptor-terminated urethane-containing prepolymer of Formula (13b), or a combination thereof:

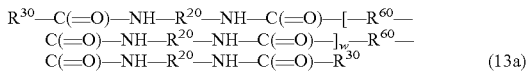

(13a)

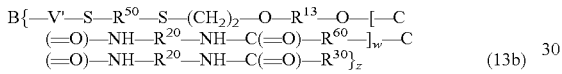

(13b)

wherein,
w is an integer from 1 to 100;
each $R^{13}$ independently comprises $C_{2-10}$ alkanediyl;
each $R^{20}$ independently comprises a core of a diisocyanate;
each $R^{30}$ independently comprises a bis(sulfonyl)alkanol, a bismaleimide, or a combination thereof;
each $R^{50}$ independently comprises a core of a sulfur-containing prepolymer;
each $R^{60}$ independently comprises a moiety comprising the structure of Formula (14):

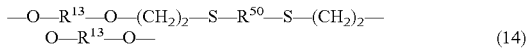

(14)

B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol.

15. The composition of claim 14, wherein each $R^{50}$ has the structure of Formula (6):

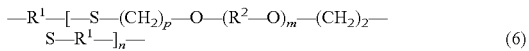

(6)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_s$—X—]$_q$—(—CHR$^3$—)$_r$—, wherein,
s is an integer from 2 to 6;
q is an integer from 1 to 5;
r is an integer from 2 to 10;
each $R^3$ is independently selected from hydrogen and methyl; and each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined as for $R^1$;
m is an integer from 0 to 50;
n is an integer from 1 to 60; and
p is an integer from 2 to 6.

16. The composition of claim 9, wherein the Michael acceptor-terminated sulfur-containing prepolymer comprises the reaction products of reactants comprising:
(a) a sulfur-containing prepolymer; and
(b) a compound comprising a terminal Michael acceptor group and a group that is reactive with a terminal group of the sulfur-containing prepolymer.

17. A composition comprising:
a Michael acceptor-terminated sulfur-containing prepolymer, wherein the Michael acceptor-terminated sulfur-containing prepolymer comprises the reaction products of reactants comprising:
(a) a sulfur-containing prepolymer; and
(b) a compound comprising a terminal Michael acceptor group and a group that is reactive with a terminal group of the sulfur-containing prepolymer, wherein the compound comprises a bis(sulfonyl)alkanol, a bismaleimide, or a combination thereof;
a thiol-terminated sulfur-containing prepolymer; and
a phosphine catalyst.

18. The composition of claim 17, wherein the compound comprising a terminal Michael acceptor group and a group that is reactive with a terminal group of the sulfur-containing prepolymer comprises 1,3-bis(vinylsulfonyl)-2-propanol, 1,1'-(methylenedi-4,1-phenylene)bismaleimide, or a combination thereof.

19. The composition of claim 8, wherein the phosphine catalyst comprises a tertiary n-hydroxyl-substituted alkyl phosphine.

20. A method of using the composition of claim 8, comprising:
providing the composition of claim 8, wherein the composition is formulated as a sealant;
applying the sealant to a substrate; and
curing the composition to provide a cured sealant.

21. The composition of claim 9, wherein the phosphine catalyst comprises a tertiary n-hydroxyl-substituted alkyl phosphine.

22. A method of using the composition of claim 9, comprising:
providing the composition of claim 9, wherein the composition is formulated as a sealant;
applying the sealant to a substrate; and
curing the composition to provide a cured sealant.

23. The composition of claim 17, wherein the phosphine catalyst comprises a tertiary n-hydroxyl-substituted alkyl phosphine.

24. A method of using the composition of claim 17, comprising:
providing the composition of claim 17, wherein the composition is formulated as a sealant;
applying the sealant to a substrate; and
curing the composition to provide a cured sealant.

25. The composition of claim 17, wherein the Michael-acceptor terminated sulfur-containing prepolymer comprises a vinyl sulfone-terminated sulfur-containing prepolymer.

* * * * *